US012579304B2

(12) United States Patent
Rolle et al.

(10) Patent No.: US 12,579,304 B2
(45) Date of Patent: Mar. 17, 2026

(54) PURPOSE-BASED PROCESSING BY PURPOSE-ACTION ASSOCIATION

(71) Applicant: SAP SE, Walldorf (DE)

(72) Inventors: Benny Rolle, Reinhardshagen (DE); Stefan Hesse, Dresden (DE); Matthias Vogel, Saarbrücken (DE); Carsten Pluder, Spiesen-Elversberg (DE)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 18/347,029

(22) Filed: Jul. 5, 2023

(65) Prior Publication Data

US 2025/0013778 A1      Jan. 9, 2025

(51) Int. Cl.
*G06F 21/62* (2013.01)

(52) U.S. Cl.
CPC .............................. *G06F 21/6245* (2013.01)

(58) Field of Classification Search
CPC ...... G06F 21/60; G06F 21/62; G06F 21/6218; G06F 21/6245
See application file for complete search history.

(56) References Cited

U.S. PATENT DOCUMENTS

| | | | |
|---|---|---|---|
| 7,308,704 B2 | 12/2007 | Vogel et al. | |
| 7,350,237 B2 | 3/2008 | Vogel et al. | |
| 7,831,567 B2 | 11/2010 | Luther et al. | |
| 8,566,193 B2 | 10/2013 | Singh et al. | |
| 9,043,874 B2 | 5/2015 | Riley | |
| 9,286,301 B2 | 3/2016 | Motoyama | |

| | | | |
|---|---|---|---|
| 9,600,831 B1 | 3/2017 | Chou et al. | |
| 9,703,813 B2 | 7/2017 | Hegde et al. | |
| 9,904,796 B2 | 2/2018 | Pluder et al. | |

(Continued)

FOREIGN PATENT DOCUMENTS

| | | |
|---|---|---|
| CA | 3096061 | 4/2023 |
| CN | 115809259 | 3/2023 |

OTHER PUBLICATIONS

Inquaero.com [online], "Fulfill GDPR Art. 17 ("Right to Erasure"): SAP ILM Simplified Blocking and Deletion", Jun. 12, 2018, retrieved on Jan. 27, 2024, retrieved from URL <https://www.inquaero.com/blog/ilm-simplified-blocking-deletion>, 17 pages.

(Continued)

*Primary Examiner* — D'Arcy Winston Straub
(74) *Attorney, Agent, or Firm* — Fish & Richardson P.C.

(57) ABSTRACT

The present disclosure involves systems, software, and computer implemented methods for data privacy protocols. One example method includes receiving information defining a purpose for processing personal data of a data category stored in an object. A first mapping is received of a processing action to the purpose. Input data to be obtained for the processing action is identified. A determination is made as to whether the input data is of the data category that has been mapped to the purpose. The processing action is executed using the input data as purpose-based processing of the input data, in response to determining that the input data can be used during execution of the processing action for the purpose. Processing of the input data by the processing action is prevented, in response to determining that the input data cannot be used during execution of the processing action for the purpose.

17 Claims, 12 Drawing Sheets

(56) References Cited

U.S. PATENT DOCUMENTS

| | | | |
|---|---|---|---|
| 10,409,790 B2 | 9/2019 | Lehnert et al. | |
| 10,430,413 B2 | 10/2019 | Christoph et al. | |
| 10,552,642 B2 | 2/2020 | Rolle et al. | |
| 10,642,805 B1 | 5/2020 | Masse | |
| 10,740,487 B2 | 8/2020 | Barday et al. | |
| 10,754,932 B2 | 8/2020 | Wiederspohn et al. | |
| 10,839,099 B2 | 11/2020 | Vogel et al. | |
| 11,042,654 B2 | 6/2021 | Nos et al. | |
| 11,113,417 B2 | 9/2021 | Rolle | |
| 2005/0044409 A1* | 2/2005 | Betz | G06F 21/6245 |
| | | | 707/999.009 |
| 2007/0089117 A1 | 4/2007 | Samson | |
| 2009/0228340 A1 | 9/2009 | Bohannon | |
| 2014/0059355 A1 | 2/2014 | Schuette et al. | |
| 2014/0082753 A1 | 3/2014 | Sarferaz | |
| 2014/0188572 A1 | 7/2014 | Hegde et al. | |
| 2014/0330869 A1* | 11/2014 | Factor | G06F 21/6281 |
| | | | 707/783 |
| 2015/0242531 A1 | 8/2015 | Rodniansky | |
| 2016/0132696 A1* | 5/2016 | Vidhani | G06Q 30/00 |
| | | | 726/28 |
| 2016/0350339 A1 | 12/2016 | Lehnert et al. | |
| 2017/0091479 A1 | 3/2017 | Pluder et al. | |
| 2018/0060343 A1 | 3/2018 | Gilbert et al. | |
| 2018/0189485 A1 | 7/2018 | Jain et al. | |
| 2019/0081990 A1* | 3/2019 | Roy | H04L 9/0891 |
| 2019/0236294 A1 | 8/2019 | McDonald et al. | |
| 2020/0019728 A1 | 1/2020 | Rolle | |
| 2020/0184087 A1 | 6/2020 | Nos et al. | |
| 2020/0285766 A1 | 9/2020 | Jois et al. | |
| 2021/0192052 A1 | 6/2021 | Loch et al. | |
| 2022/0043917 A1 | 2/2022 | Rolle | |
| 2022/0050834 A1 | 2/2022 | Rolle et al. | |
| 2022/0050920 A1 | 2/2022 | Rolle | |
| 2022/0058333 A1 | 2/2022 | Rolle | |
| 2022/0100755 A1 | 3/2022 | Rolle | |
| 2022/0277023 A1 | 9/2022 | Rolle et al. | |
| 2022/0309052 A1 | 9/2022 | Rolle | |
| 2023/0043503 A1* | 2/2023 | Bradbury | G06F 21/53 |
| 2023/0185938 A1 | 6/2023 | Schmidt et al. | |
| 2023/0244637 A1 | 8/2023 | Wu | |
| 2025/0013602 A1 | 1/2025 | Hesse et al. | |

OTHER PUBLICATIONS

SAP "SAP Asset Manager Security Guide" Dec. 10, 2020, 28 pages.

SAP "SAP Event Stream Processor: Security Guide" Sep. 23, 2019, 58 pages.

U.S. Appl. No. 17/186,934, Rolle et al., filed Feb. 26, 2021.

U.S. Appl. No. 17/457,797, Ighoroje et al., filed Dec. 6, 2021.

U.S. Appl. No. 17/457,802, Rolle et al., filed Dec. 6, 2021.

U.S. Appl. No. 17/457,811, Rolle et al., filed Dec. 6, 2021.

U.S. Appl. No. 17/457,816, Vogel et al., filed Dec. 6, 2021.

U.S. Appl. No. 17/457,824, Vogel et al., filed Dec. 6, 2021.

U.S. Appl. No. 17/457,827, Ighoroje et al., filed Dec. 6, 2021.

U.S. Appl. No. 17/680,717, Rolle et al., filed Feb. 25, 2022.

U.S. Appl. No. 17/680,741, Rolle et al., filed Feb. 25, 2022.

U.S. Appl. No. 17/680,759, Rolle et al., filed Feb. 25, 2022.

U.S. Appl. No. 17/680,858, Rolle., filed Feb. 25, 2022.

U.S. Appl. No. 17/702,013, Rolle., filed Feb. 23, 2022.

U.S. Appl. No. 17/718,770, Rolle., filed Apr. 12, 2022.

U.S. Appl. No. 18/049,063, Hesse et al., filed Oct. 24, 2022.

U.S. Appl. No. 18/073,164, Rolle et al., filed Dec. 1, 2022.

U.S. Appl. No. 18/074,745, Vogel et al., filed Dec. 5, 2022.

U.S. Appl. No. 18/077,476, Rolle et al., filed Dec. 8, 2022.

U.S. Appl. No. 18/077,493, Rolle et al., filed Dec. 8, 2022.

U.S. Appl. No. 18/347,065, Hesse et al., filed Jul. 5, 2023.

Help.sap.com [online], "End of Purpose (EoP) Check" Nov. 2020, [retrieved on Nov. 12, 2020], retrieved from: URL <https://help. sap.com/viewer/05a5505cc81943fb9d01e84cb2e135ef/750%20SP09/ en-US/32b45853b2dc7425e10000000a44176d.html>, 3 pages.

Help.sap.com [online], "Master Data Integration" Nov. 2020, [retrieved on Mar. 16, 2021], retrieved from: URL <https://help.sap.com/ viewer/99218f2c48044ddc8f2ea30adc0e38a1/7.1.21/en-US/ 46b8065a4df01517e10000000a114a6b.html?q-master%20data% 20integration>, 2 pages.

Help.sap.com [online], "Processing Purposes" Jul. 2023, retrieved on Jul. 5, 2023, retrieved from URL <https://help.sap.com/docs/ customer-data-platform/user-guide/processing-purposes?q=puposes. >, 9 pages.

Help.sap.com [online], "SAP Information Lifecycle Management" Nov. 2020, [retrieved on Mar. 16, 2021], retrieved from: URL <https://help.sap.com/doc/PRODUCTION/ c3b6eda797634474b7a3aac5a48e84d5/1610%20002/en-US/frameset. htm>, 4 pages.

Sap.com [online], "What is Gigya?" Aug. 2022, retrieved on Jul. 5, 2023, retrieved from URL <https://www.sap.com/products/acquired-brands/what-is-gigya.html?url_id=text-de-404-reclink>, 5 pages.

Wikipedia.org [online], "General Data Protection Regulation" Jan. 2013, [retrieved on Mar. 16, 2021], retrieved from: URL <https:// en.wikipedia.org/wiki/General Data Protection Regulation>, 16 pages.

Wikipedia.org [online], "Hyperscale computing" created on May 2013, retrieved on Dec. 1, 2022, retrieved from URL <https://en. wikipedia.org/wiki/Hyperscale_computing>, 2 pages.

Wikipedia.org [online], "Information privacy" created on May 2003, retrieved on Dec. 6, 2021, retrieved from URL <https://en. wikipedia.org/wiki/Information_privacy>, 7 pages.

Wikipedia.org [online], "Master Data" created on Oct. 2006, retrieved on Dec. 6, 2021, retrieved from URL <https://en.wikipedia.org/ wiki/Master_data>, 2 pages.

Wikipedia.org [online], "Personal Data" created on May 2005, retrieved on Dec. 6, 2021, retrieved from URL <https://en.wikipedia. org/wiki/Personal_data>, 7 pages.

Wikipedia.org [online], "Personal Identifier" created on Feb. 2007, retrieved on Dec. 1, 2022, retrieved from URL <https://en.wikipedia. org/wiki/Personal_identifier>, 3 pages.

Non-Final Office Action in U.S. Appl. No. 18/347,065, mailed on Oct. 7, 2025, 16 pages.

Final Office Action in U.S. Appl. No. 18/347,065, mailed on Mar. 27, 2025, 20 pages.

Non-Final Office Action in U.S. Appl. No. 18/347,065, mailed on Nov. 13, 2024, 21 pages.

* cited by examiner

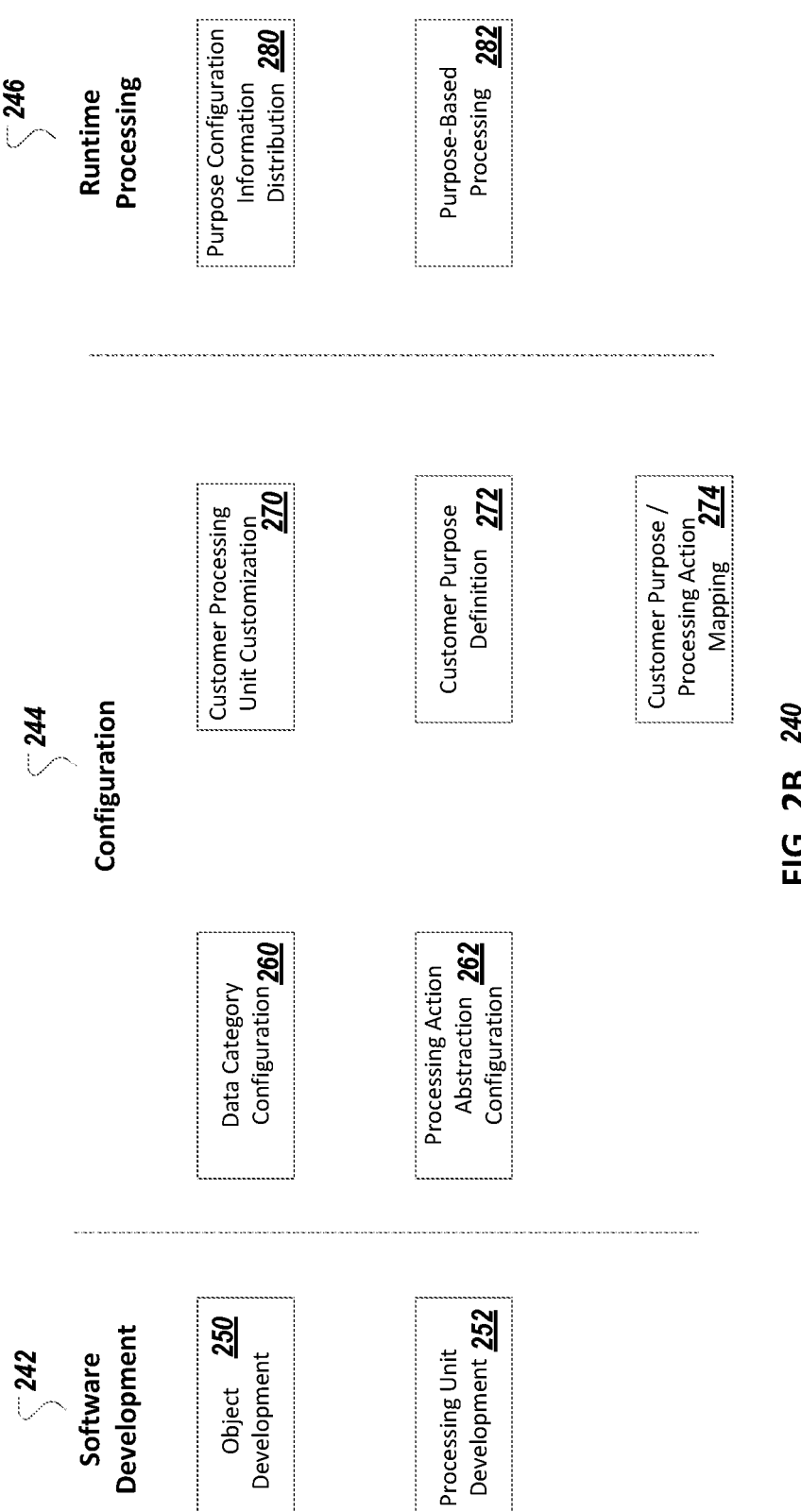

246

Runtime Processing

Purpose Configuration Information Distribution 280

Purpose-Based Processing 282

244

Configuration

Customer Processing Unit Customization 270

Customer Purpose Definition 272

Customer Purpose / Processing Action Mapping 274

Data Category Configuration 260

Processing Action Abstraction Configuration 262

242

Software Development

Object Development 250

Processing Unit Development 252

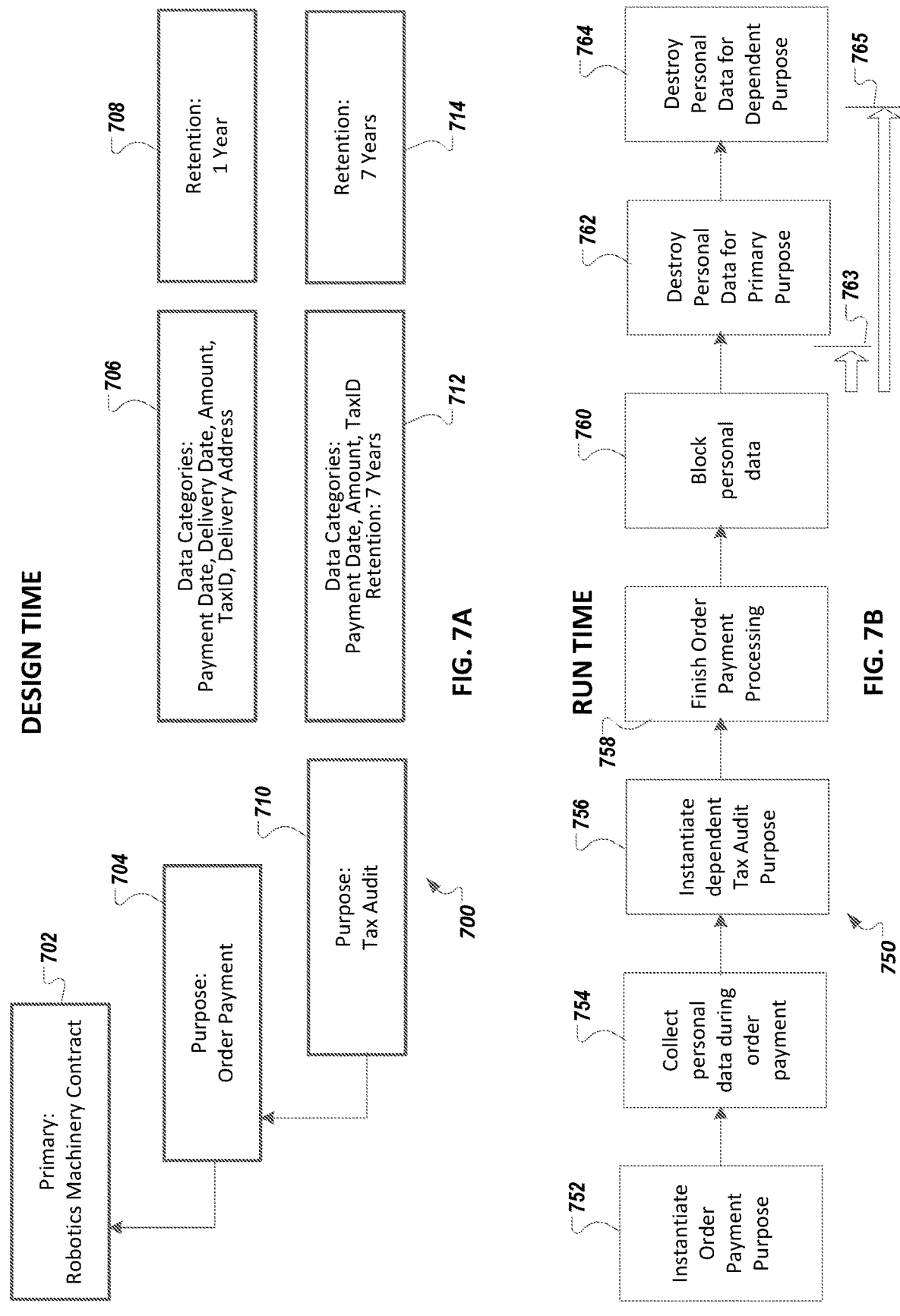

DESIGN TIME

*708* — Retention: 1 Year

*714* — Retention: 7 Years

*706* — Data Categories: Payment Date, Delivery Date, Amount, TaxID, Delivery Address

*712* — Data Categories: Payment Date, Amount, TaxID Retention: 7 Years

*702* — Primary: Robotics Machinery Contract

*704* — Purpose: Order Payment

*710* — Purpose: Tax Audit

RUN TIME

*752* — Instantiate Order Payment Purpose

*754* — Collect personal data during order payment

*756* — Instantiate dependent Tax Audit Purpose

*758* — Finish Order Payment Processing

*760* — Block personal data

*762* — Destroy Personal Data for Primary Purpose

*764* — Destroy Personal Data for Dependent Purpose

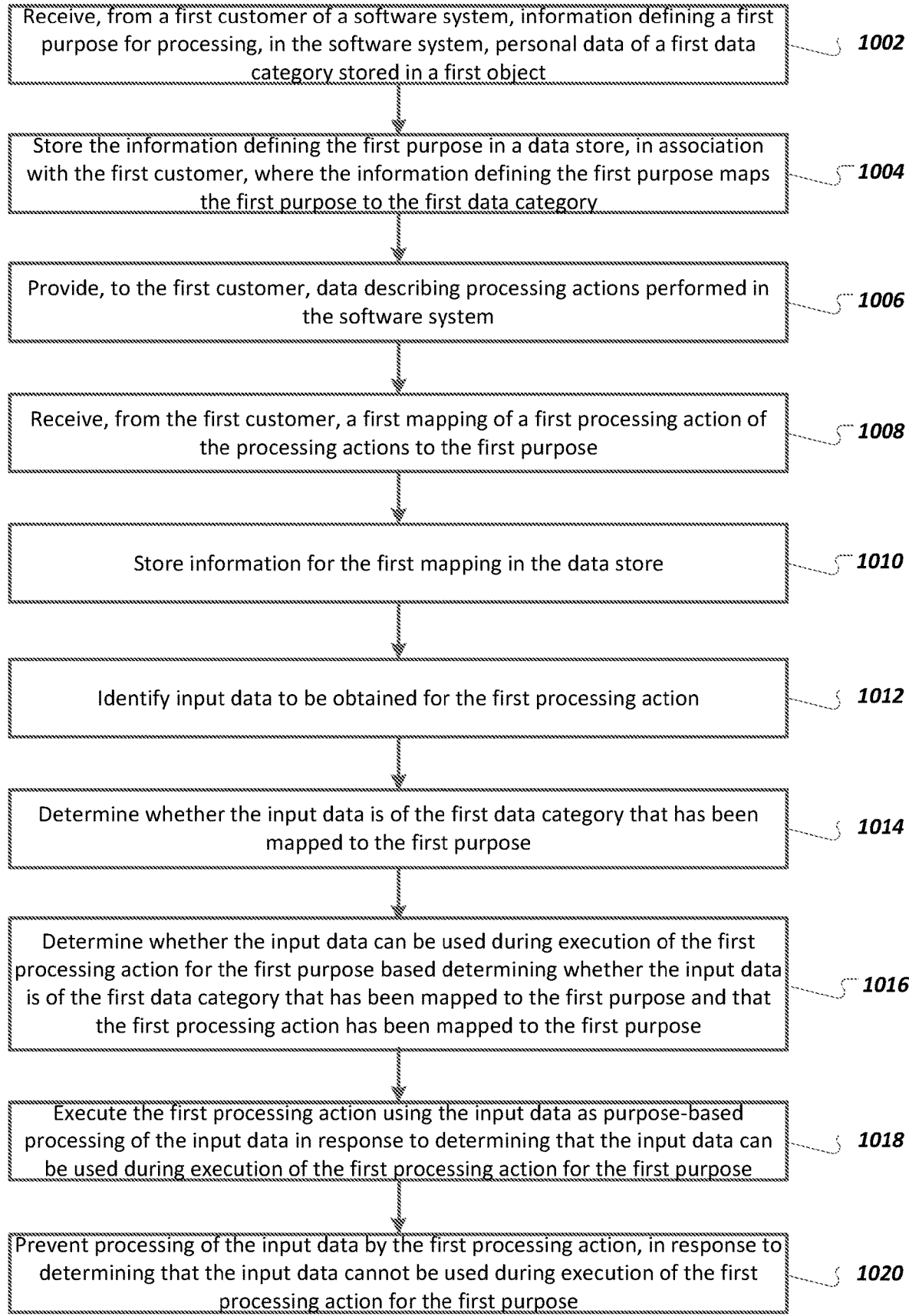

Receive, from a first customer of a software system, information defining a first purpose for processing, in the software system, personal data of a first data category stored in a first object                                    1002

Store the information defining the first purpose in a data store, in association with the first customer, where the information defining the first purpose maps the first purpose to the first data category                                    1004

Provide, to the first customer, data describing processing actions performed in the software system                                    1006

Receive, from the first customer, a first mapping of a first processing action of the processing actions to the first purpose                                    1008

Store information for the first mapping in the data store                                    1010

Identify input data to be obtained for the first processing action                                    1012

Determine whether the input data is of the first data category that has been mapped to the first purpose                                    1014

Determine whether the input data can be used during execution of the first processing action for the first purpose based determining whether the input data is of the first data category that has been mapped to the first purpose and that the first processing action has been mapped to the first purpose                                    1016

Execute the first processing action using the input data as purpose-based processing of the input data in response to determining that the input data can be used during execution of the first processing action for the first purpose                                    1018

Prevent processing of the input data by the first processing action, in response to determining that the input data cannot be used during execution of the first processing action for the first purpose                                    1020

FIG. 10   1000

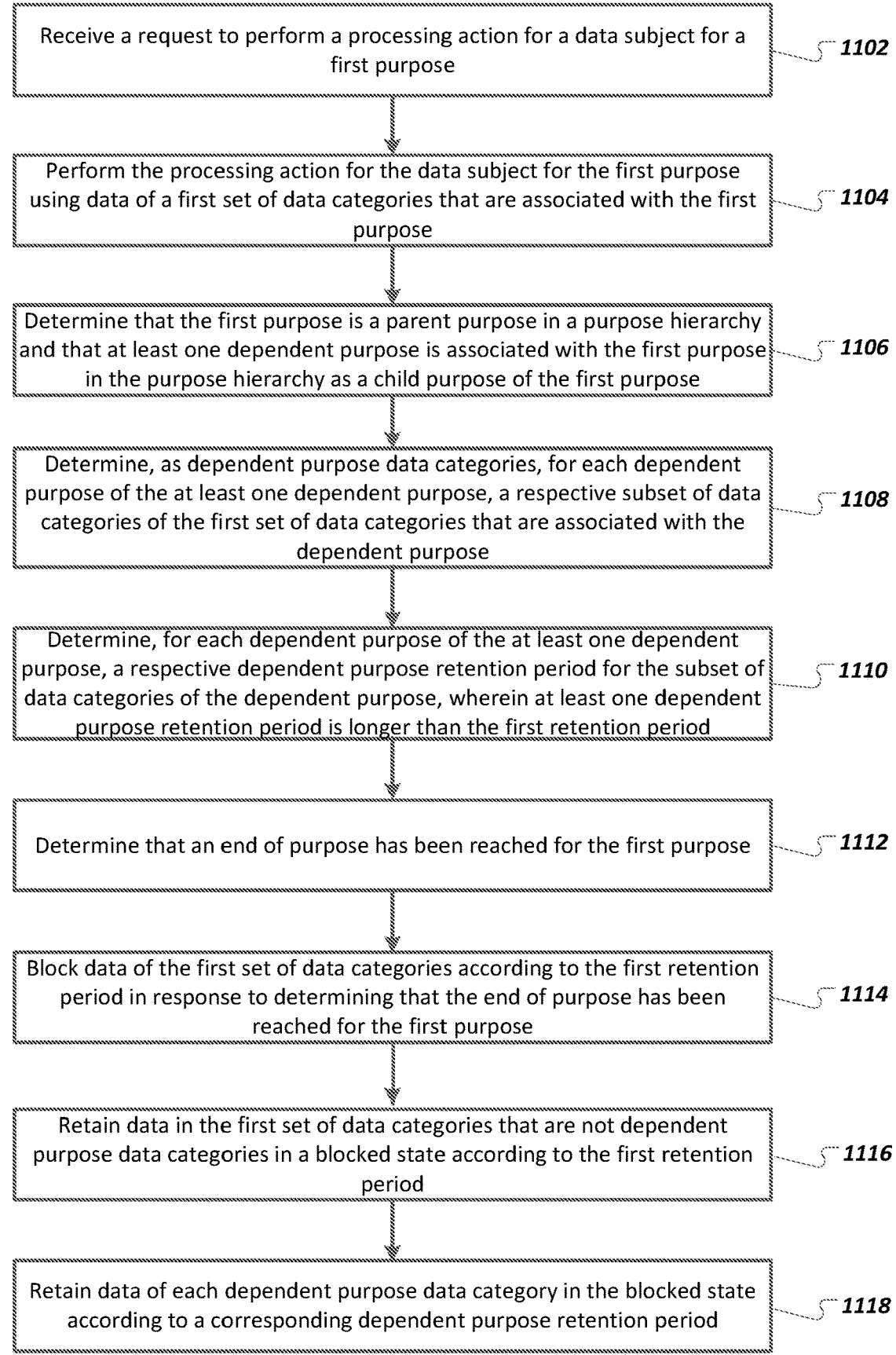

Receive a request to perform a processing action for a data subject for a first purpose ⟋1102

Perform the processing action for the data subject for the first purpose using data of a first set of data categories that are associated with the first purpose ⟋1104

Determine that the first purpose is a parent purpose in a purpose hierarchy and that at least one dependent purpose is associated with the first purpose in the purpose hierarchy as a child purpose of the first purpose ⟋1106

Determine, as dependent purpose data categories, for each dependent purpose of the at least one dependent purpose, a respective subset of data categories of the first set of data categories that are associated with the dependent purpose ⟋1108

Determine, for each dependent purpose of the at least one dependent purpose, a respective dependent purpose retention period for the subset of data categories of the dependent purpose, wherein at least one dependent purpose retention period is longer than the first retention period ⟋1110

Determine that an end of purpose has been reached for the first purpose ⟋1112

Block data of the first set of data categories according to the first retention period in response to determining that the end of purpose has been reached for the first purpose ⟋1114

Retain data in the first set of data categories that are not dependent purpose data categories in a blocked state according to the first retention period ⟋1116

Retain data of each dependent purpose data category in the blocked state according to a corresponding dependent purpose retention period ⟋1118

FIG. 11 _1100_

PURPOSE-BASED PROCESSING BY PURPOSE-ACTION ASSOCIATION

TECHNICAL FIELD

The present disclosure relates to computer-implemented methods, software, and systems for data privacy protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for data privacy protocols. An example method includes: receiving, from a first customer of a software system, information defining a first purpose for processing, in the software system, personal data of a first data category stored in a first object; storing the information defining the first purpose in a data store, in association with the first customer, wherein the information defining the first purpose maps the first purpose to the first data category; providing, to the first customer, data describing processing actions performed in the software system; receiving, from the first customer, a first mapping of a first processing action of the processing actions to the first purpose, wherein the first mapping indicates that data of the first data category of the first object can be processed by the first processing action for the first purpose; storing information for the first mapping in the data store; identifying input data to be obtained for the first processing action; determining whether the input data is of the first data category that has been mapped to the first purpose; determining whether the input data can be used during execution of the first processing action for the first purpose based on determining whether the input data is of the first data category that has been mapped to the first purpose and that the first processing action has been mapped to the first purpose; executing the first processing action using the input data as purpose-based processing of the input data, in response to determining that the input data can be used during execution of the first processing action for the first purpose; and preventing processing of the input data by the first processing action, in response to determining that the input data cannot be used during execution of the first processing action for the first purpose.

Implementations can include one or more of the following features. The data store can include data for a second customer of the software system and the data for the second customer can include information for a second purpose for the second customer and a second mapping that maps the second purpose to the first processing action, where the second purpose is a different purpose than the first purpose. The first processing action can correspond to an abstract action that is associated with one or more executable processing units that include at least a first processing unit. Identifying input data to be obtained for the first processing action can include identifying an actual parameter value provided by a calling processing unit that invokes the first processing unit. Preventing processing of the input data by the first processing action can include preventing, by the calling processing unit, an invocation of the first processing unit with the actual parameter value. Identifying input data to be obtained for the first processing action can include identifying data the first processing unit has requested from shared storage or a global variable. Preventing processing of the input data by the first processing action can include preventing the first processing unit from obtaining the data the first processing unit has requested from the shared storage or the global variable. Identifying input data to be obtained for the first processing action can include identifying data that an interface or function invoked by the first processing unit intends to provide to the first processing unit. Preventing processing of the input data by the first processing action can include preventing the first processing unit from obtaining the data that the interface or the function invoked by the first processing unit intends to provide to the first processing unit. The data describing processing actions performed in the software system can include data obtained from a process modeling system.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2B is a block diagram that illustrates phases related to purpose-based processing.

FIG. 7A illustrates an example system for design time configuration of primary and dependent purposes.

FIG. 7B illustrates an example process for runtime processing of data according to dependent purposes.

FIG. 10 is a flowchart of an example method for purpose-based processing.

FIG. 11 is a flowchart of an example method for handling of dependent purposes.

DETAILED DESCRIPTION

Figure 1:
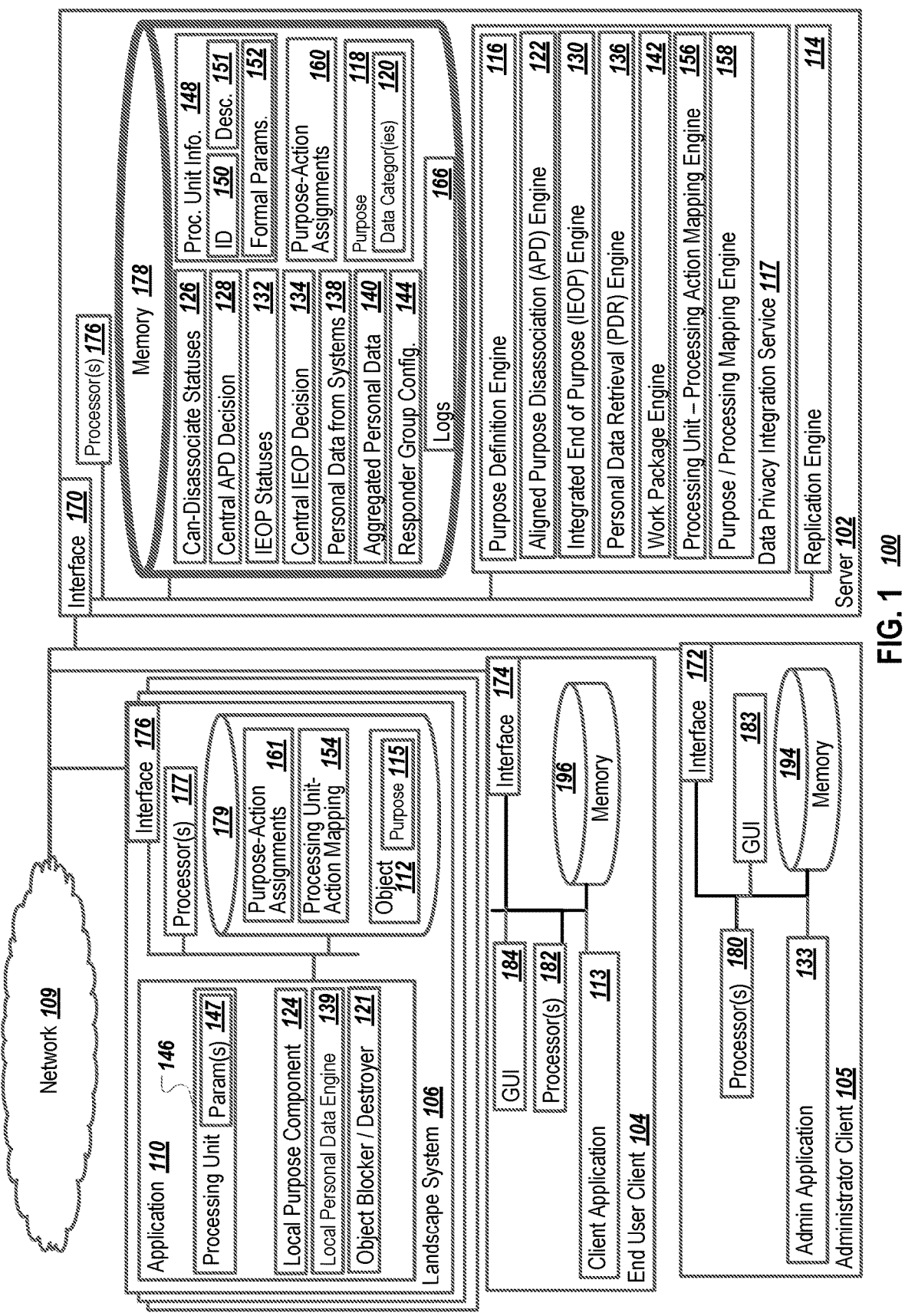
FIG. 1 is a block diagram illustrating an example system for integrated data privacy services.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block application in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

Implementations described herein include a software system in which a data controller (e.g., a customer of the software system) models purposes for which personal data is processed links custom-defined purposes with processing actions that are performed for these purposes, so that the processing of personal data within the software system is purpose-based. The system provides numerous advantages. For example, links between purposes that are associated with data objects and processing activities of the software system enables the data controller to specify which data flows into a processing unit, thus implementing purpose-based processing. As described in more detail below processing units are executable software artifacts that can accept input(s) and perform certain processing using the input(s). One or more processing units can be associated with a more abstract processing action, as described below. Additionally, as described in more detail below, data categories can be associated with purposes to define what personal data of which data categories can be used for different processing steps. The use of data categories and purpose-action assignments can simplify how customers reach compliance with data privacy regulations, by reducing reliance on inconsistent or error-prone manual approaches. The solutions described herein can also help ensure that personal data concerning certain data subjects is processed with a higher data protection level than other approaches, since the solutions increase compliance when implemented. Further, as described in more detail below, distribution of data across systems in a landscape can be based on assigned purposes.

As described in more detail below, purposes can also be modeled using a purpose hierarchy. In the purpose hierarchy, dependent purposes inherently related to a purpose can be defined with different characteristics from the parent purpose, such as different retention periods. Dependent purposes can be automatically applied to a data object in response to the data object being associated with the parent purpose, which can be faster and less resource intensive than other approaches, such as approaches that involve scanning a database to evaluate whether additional purpose assignments should occur based on conditions of data in a data table. For instance, a tax audit purpose may be automatically assigned to a data object representing an employee based on a payroll purpose being assigned to the data object. Alternative approaches may involve scanning a database to determine that a salary payment has been applied to the employee, in order to determine that tax audit also now applies. Additionally, use of dependent purposes can enhance personal data management in other ways, such as by enabling object data blocking and object data destruction according to different retention periods between parent and related child purposes. In general, dependent purposes can help control for which purposes data can be processed.

Furthermore, in some implementations, purpose information, including dependent purpose information, can be stored in association with data which can result in easier data generation for an audit as compared to other approaches in which dependent purposes are not directly linked to data. For example, retrieving data associated with a tax audit purpose can be performed by simply filtering on the dependent tax audit purpose, rather than by determining data associated with purposes that implicitly map to the tax audit dependent purpose.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer. Defined purposes can be stored as purposes 118.

In some cases and as described in more detail below, a purpose 118 can be associated with data categories 120. An administrator can assign one or more data categories 120 to a purpose 118 to specify which of potentially different attribute sets stored for a data object can be used when data for the purpose 118 is processed. As described in more detail below, a purpose 118 may exist in a purpose hierarchy and may have one or more dependent purposes. Dependent purposes may represent complementary purposes that can allow a more granular differentiation of data protection measures such as different retention and deletion rules (and other aspects), as compared to a parent purpose. For instance, a parent purpose such as contractual pay for employee work may have a dependent purpose such as tax audit. Processing under the tax audit dependent purpose may use a subset of data (e.g., a subset of data categories) than used for the parent contractual pay purpose and may have a longer retention period. Accordingly, the object blocker/destroyer can destroy object data (e.g., portions of object data) at different times according to different retention periods as configured for different purposes in a purpose hierarchy.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose. Purpose-based processing can be performed in the landscape system 106, as described in more detail below.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned disassociation approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End of Purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144.

Referring again to purpose-based processing, various portions of the system 100 can be used to implement purpose-based processing for a customer. Purpose checks can be performed before a data object is accessed, for example. For example, processing in the system 100 can be performed using processing units 146 of various applications 110 in landscape systems 106. Processing units 146 can be used to implement the applications 110 and can include, for example, functions, class methods, reports, or other units of executable software. A processing unit 146 can, when executed, accept one or more runtime parameters 147 (which can be referred to as actual parameters). A processing unit 146 can obtain input data in other ways other than as actual parameters received from an invocator of the processing unit 146, such as reading data from shared storage, from an API (Application Programming Interface) while the processing unit 146 is being executed, from a global variable, or as a return value from invocation of another processing unit. Regardless of how input data is obtained, a purpose check can be performed before the processing unit 146 processes the input data, as described in more detail below.

The server 102 (or another system) can include processing unit information 148. The processing unit information 148 can include, for each processing unit 146, a processing unit identifier 150, processing unit descriptive information 151, and formal parameter information 152. The processing unit descriptive information 151 can include descriptive attributes for usability reasons, such as a descriptive (e.g., human-readable) processing unit name, a narrative processing unit description, etc.). The formal parameter information 152 describes types of data that are acceptable to provide, at runtime, as runtime parameters 147 for the processing unit.

As an example, a financial application may include a money transfer processing unit, which may be described by a processing unit identifier 150 of "MON_TRANSF", processing unit descriptive information 151 that includes, for example a function name of "Money Transfer", and formal parameter information 152 that describes formal parameters of money transfer recipient information, money transfer sender information, and money transfer wire information. For example: the money transfer recipient information can be a data structure that includes a recipient name, recipient account number, recipient bank number and recipient bank name; the money transfer sender information can include a sender name and sender account number; and the money transfer wire information can include an amount of money to be transferred and a subject.

The processing unit information 148 can be information that is provided by the software provider that implements and provides the application 110 and the landscape system 106 (e.g., since the processing units 146 are a direct result of software development of the application 110). As described in more detail below, a customer of the software system can link customer-defined purposes with processing that may be executed for the purpose. However, as described in more detail below with respect to FIG. 2B, customers generally aren't interested in (and need not be aware of) exact technical implementations of the processing units 146. Accordingly, processing unit/processing action mappings 154 can be generated by a processing unit/processing action mapping engine 156 (or at least in part by a human expert) and stored, e.g., either in the landscape system 106 as shown, and/or centrally at the server 102. A processing action is a more abstract notion of processing done by one or more processing units which generally has meaning for the customer. A processing action can represent, for example a set of processing units that have high cohesion with one another. Processing action descriptions or names can use descriptive information for one or more processing units and/or can use information obtained from a processing modeling/management portion of the processing unit/processing action mapping engine 156.

After abstract processing action descriptions have been generated or identified, the customer can use a purpose/ processing mapping engine 158 to map purpose(s) 118 to processing action(s), for storage as purpose-action assignments 160 and/or 161. The purpose-action assignments 160/161 and purpose definitions of the purposes 118 can be used at runtime to implement purpose-based processing.

For example, at run time, a processing action can be performed (e.g., by executing at least one processing unit 146 associated with the processing action). The processing unit 146 can obtain input data, for example, using one of the approaches described above. For example, the local purpose component 124 (or another component) can perform a run time match check before the processing unit 146 is executed (or before the processing unit 146 processes the input data) to determine whether the input data has been associated with a purpose 118 that matches a purpose that has been associated with the processing action to which the processing unit 146 belongs. If there is a purpose match, the processing unit 146 can be invoked (or can be informed that processing of the input data is acceptable, if the check occurs during execution of the processing unit 146). If there is a purpose mismatch or if the input data actually is not associated with a purpose when the processing action is associated with at least one purpose, invocation of the processing unit 146 can be blocked or processing of the input data can be otherwise prohibited (or in some implementations, the processing unit 146 can be invoked but an error or warning message can be logged in logs 166 and/or submitted to an administrator).

If the input data is not received as an actual parameter to the processing unit 146, the purpose check can be performed, for example, when (a) the processing unit 146 wants to access global variables or shared storage; or (b) when data is returned to the processing unit 146 from another processing unit. For example, suppose a first processing unit that is associated with a first purpose calls a second processing unit that is associated with a second purpose. The second processing unit might generate a return value. Before the first processing unit can access the return value generated by the second processing unit, a purpose check may be performed to determine whether the first purpose equals the second purpose (e.g., that the first processing unit is associated with the second purpose).

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an email server, a Web server, a caching server, a streaming data server, and/or other suitable server.

Interfaces 170, 172, 173, and 174 are used by the server 102, the end-user client device 104, the landscape system 106, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP 00 (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 178. In some implementations, the server 102 includes multiple memories. The memory 178 may include any type of memory or database module and may take the form of volatile and/or non-volatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 133, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2A:
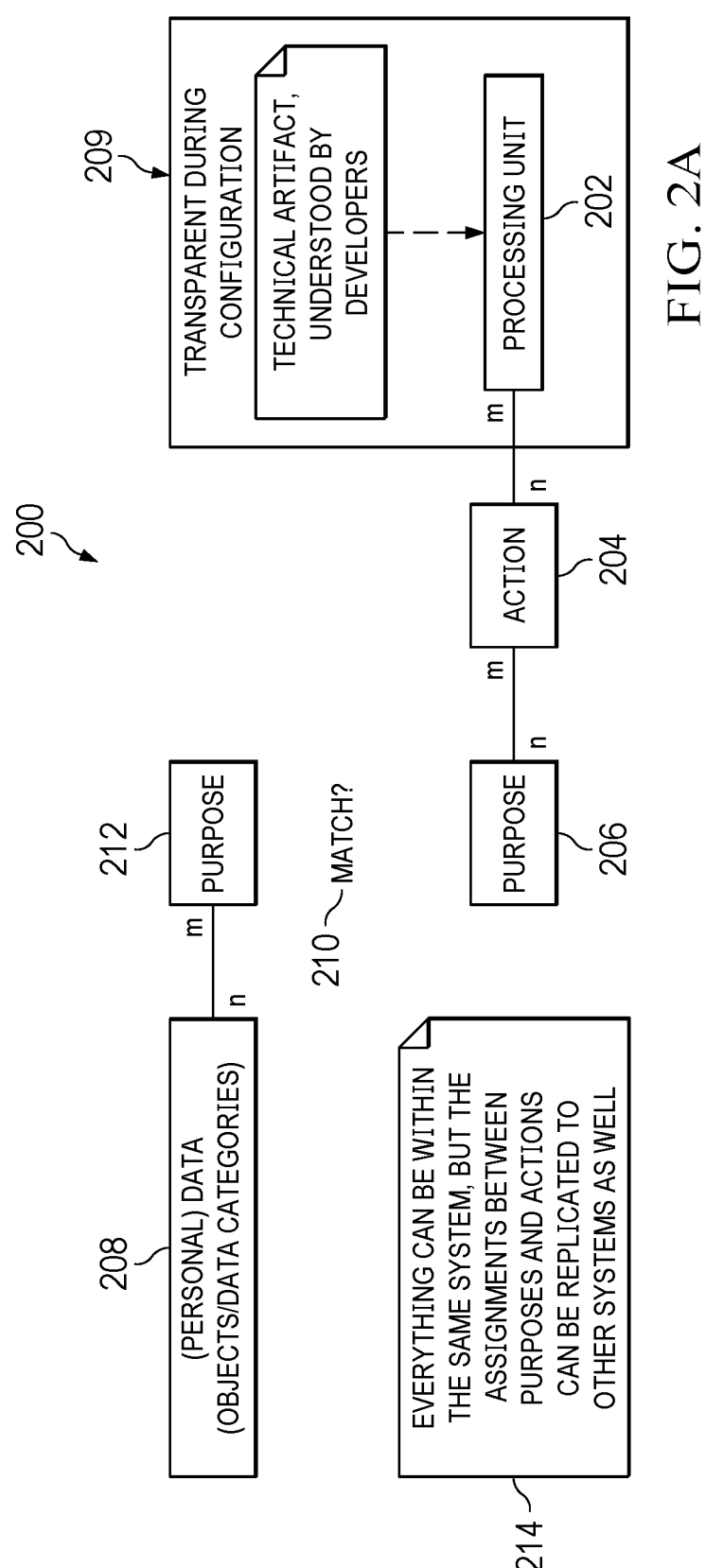
FIG. 2A illustrates an example system for purpose-based processing.

FIG. 2A illustrates an example system 200 for purpose-based processing. A processing unit 202 is a technical artifact understood by developers. The processing unit 202 can be associated with one or more abstract processing actions 204, where the abstract processing actions 204 have meaning to a customer of the software system. A given abstract processing action 204 can be associated with one or more processing units 202. The system 200 supports a 1:1 relation between a processing unit 202 and processing action 204. At design time, the customer can associate a processing action 204 with one or more purposes 206. As indicated by a note 209, details about processing units 202 can be transparent to the customer when the customer associates a purpose 206 with a processing action 204. For instance, the customer may associate a purpose with a single "bank transfer" processing action 204, even though multiple different processing units 202 may be involved in the system for execution of a bank transfer. Also at design time, the customer can associate the purpose 206 with one or more data categories. At run time, the processing action 204 can be performed (e.g., by executing at least one processing unit 202 associated with the processing action). An invocation of the processing unit 202 can include obtaining of input data 208, for example (e.g., as an actual parameter, from shared storage or global variable, or as a value obtained during execution from an API or other processing unit).

A run time match check 210 can be performed, before the processing unit 202 processes the input data 208, to determine whether the input data 208 has been associated with a purpose 212 that matches the purpose 206 that has been associated with the processing action 204 to which the processing unit 202 belongs. If there is a match between the purpose 212 and the purpose 206, the processing unit 202 can be invoked (or the processing unit can be permitted to process the input data 208 if the check is performed during execution of the processing unit 202). If there is a mismatch between the purpose 212 and the purpose 206 (or if the input data 208 actually is not associated with a purpose when the processing action 204 is associated with at least one purpose), invocation of the processing unit 202 can be blocked (or the or the processing unit can be permitted to process the input data 208 if the check is performed during execution of the processing unit 202). In some implementations, the processing unit 202 can be invoked (or be permitted to process the input data 208) but an error or warning message can be logged and/or submitted to an administrator. As described by a note 214, purpose information can be distributed in a landscape. Further details regarding purpose configuration, distribution, and runtime purpose-based processing are described below with respect to FIG. 2B.

FIG. 2B is a block diagram that illustrates phases 240 related to purpose-based processing. The phases 240 include a software development phase 242, a configuration phase 244, and a runtime processing phase 246. The software development phase 242 includes object development 250 and processing unit development 252. The phases 240 can be performed sequentially or can be performed in cycles. For instance, software developers may be developing a next set of processing units during or after customer configuration activities. As another example, the customer may be making configurations, while the software is live, that are to be applied at a later point in time.

Object development 250 can include development, by software developers of the software provider, of object types for which personal data might be stored. Example object types may include WorkforcePerson which can represent an employee of an organization that uses software provided by the software provider, Business Partner which can represent (among other entities) an individual that interacts with the organization, Customer which can represent a customer of the organization, or other objects. As another example, a Financial Transfer Object can be used for financial transfers to customers or employees (e.g., bank transfers or other types of financial transfers such as online payments). Development of the object types may include identification of fields or sub objects which may include personal data. Object development 250 can include development of data portions of object classes that represent the respective object types. Object development 250 can also include development of database tables that can store data for respective instances of the object types. In some implementations, object development 250 may include designation (or at least consideration) of fields which may be associated with certain data categories. In some implementations, data category configuration 260 is a sub phase of the software-provider configuration phase 244.

Processing unit development 252 includes development, by software developers, of various types of processing units, including functions, reports, and class methods. As described above, a processing unit can be defined, in party, by specifying formal parameters which describe number and types of input data that the processing unit can accept, as input(s) to be used during the processing performed by the processing unit. As described herein, processing performed by processing units is configured in the system 100 to be purpose-based, during the runtime processing phase 246. For a financial transfer scenario, processing units can be developed, for instance, for 1) capturing information from a user interface for a new bank transfer; 2) downloading bank transfer information from a server; 3) uploading bank transfer information from a local file; 4) validating bank transfer information; 5) sending the bank transfer information to a bank server; 6) faxing bank transfer information to a bank fax number; 7) printing information to send to a bank mail address; 8) establishing a secure connection with a bank using a specific protocol; 9) logging status of a bank transfer; and 10) similar processing units as 1) to 9) but for online payment transfers.

The configuration phase 244 can include data category configuration 260, processing action abstraction configuration 262, customer processing unit customization 270, customer purpose definition 272, and customer purpose/processing action mapping 274. Data category configuration 260 can include definition of various data categories.

A data category can serve as semantic label for a semantic set of attributes/fields of personal data. Different data categories may represent different types of personal data. Data assigned to a data category may be intended to be used by a processing unit as a semantical unit. A data category can refer to a name for an attribute set that can be used as actual parameter when executing a processing unit for a given purpose. As described below, data categories can be assigned to a purpose to specify which of potential many attribute sets stored for a data object can be used when data for the purpose is processed. For example, a Business Partner object may have "home address" and "business address" fields that are respectively assigned to "home address and "business address" data categories. Some purposes may be assigned to the "home address" data category to enable actions using home address data but not using business address data. As another example, data categories can be "personal bank account" for bank account information for an employee, "business account" for bank account information for a company customer, "personal online payment" for account information for a personal online payment account for reimbursements, etc.

Defined data categories can be assigned to personal data on a class/entity/table basis and/or on an instance/row basis, such as via annotations or metadata. For example, an entity-level assignment can be used to specify that a certain home address data field (or sub object) of a WorkforcePerson object type holds data of a "home address" data category. As another example, an instance-level assignment can include assigning a data category of "historic" to certain sets of customer bank account information, to flag that such account data is historical reference data but not active account data. Different types of data category configuration can be performed by software provider administrator(s) and/or customer administrators.

As described in more detail below, a customer can associate a purpose with processing that can be performed for that purpose. However, a customer generally is not interested in either which processing units are used or processing unit implementation details (e.g., exact function names, class names, method names, etc.) used by software developers in the software development phase 242. Accordingly, the processing action abstraction configuration 262 can include establishing abstract processing actions, that generally have more meaning to a customer, that are mapped to more technical processing units. As examples, abstract processing actions that can be mapped to sets of the financial processing units described above can be "bank account transfer" or "online payment transfer". In some cases, software developers provide descriptive names and/or descriptive text for processing units (along with technical names or identifiers). In such cases, the descriptive processing unit descriptions can be surfaced to customers as more meaningful and more abstract processing action text. In some cases, software provided by the software provider includes a process modeling portion which includes process models that provide abstractions for processing available in the software system. In such cases, process names and/or descriptions of processes in the process model(s) can be surfaced to customers as abstract processing actions. Processing actions are used by customers for linking to customer-defined purposes, as described below.

For some customers, the configuration phase 244 includes customer processing unit customization 270. A customer may, for example, add custom processing units to the software, delete existing processing units, or change existing processing units. For example, in some implementations, a customer administrator who considers it relevant to the organization to change processing unit descriptions can change the processing unit information using an administrative application. For instance, a company using an on-premise system might be able to add custom processing units to the software, delete existing processing units, and/or change existing processing units and make corresponding changes to relevant processing unit information. For example, a particular customer may decide that faxing is no longer supported for financial transfers and may therefore disable the faxing processing unit (or may disassociate the faxing processing unit from the "bank transfer" processing action. As another example, a customer might want to edit processing unit descriptive information for a processing unit because a provided extensibility option was used by the customer to modify how a processing unit processes data. For instance, an add-in might be implemented by the customer which has the effect that a certain input value into a processing unit is removed before the processing unit is executed. For example, a customer may decide to not process any gender information in a specific context (e.g., human resources), and all gender information that would be processed by certain processing units may be removed or replaced by a placeholder such as "unspecified". In this example, the customer can modify processing unit descriptive information to reflect the changes to the affected processing units. In some cases, the customer can provide abstract processing action descriptions that correspond to any customer-changed processing units. A processing action name can be a descriptive name the customer has provided for a changed processing unit, for example.

The customer purpose definition 272 activities can include customers performing purpose modeling. Modeling a purpose can include associating one or more data categories with a purpose. A customer can assign a data category to a purpose to specify which of the potential attribute sets stored for a data object can be used when data for the purpose is processed. That is, when a certain type of object (e.g., WorkforcePerson) is processed for a given purpose, the data categories linked to that purpose can indicate which data categories of object data can be processed for that purpose. For example, a customer may model a mail employment contract purpose for a WorkforcePerson object and associate a home address data category with the mail employment contract purpose. As another example, a customer may model a private costs reimbursement purpose for a WorkforcePerson object and associate a "private account" data category with that purpose. In some cases, data categories can be assigned to purposes using wildcards or other types of expressions which can be evaluated at runtime, as described below in discussion of runtime processing. A customer can also configure retention times for a purpose that indicate how long to keep personal data specified by the data categories linked to the purpose. Configuration of data categories and linking data categories to purposes is described in more detail in U.S. patent application Ser. No. 17/867,642, filed on Jul. 18, 2022 entitled "PURPOSE-BASED DATA MANAGEMENT FOR COMPUTING SYSTEMS," which is hereby incorporated by reference.

The customer purpose/processing action mapping 274 can include, for example, a customer administrator associating purposes defined by the customer with processing action(s) that are executed for those purposes. The administrator can associate processing actions with purposes using a user interface, as described below with respect to FIG. 5.

In some implementations, the user interface can suggest or restrict mappings so that input data of a processing action that is linked to a purpose matches a data type of a data category that is associated with the purpose. As mentioned above, processing actions can be abstractions of and mappings to technical processing units. Input data of a processing action can correspond to input data (e.g., formal input parameters) of processing unit(s) that have been mapped to the processing action. Linking a purpose to a processing action can result in each processing unit that has been mapped to the processing action also being linked to the purpose. Processing unit identifiers, for example, can be linked (either directly or indirectly by virtue of an association with a related processing action) with an identifier of a purpose.

Processing actions may be associated with one or more purposes and multiple processing actions can be associated with the same purpose. For example a "transfer data to credit agency" processing action may be mapped to a pay with bank account purpose and a create phone contract purpose. In some cases and for some processing actions, a constraint can be enforced that only one purpose can be associated with the processing action.

In some cases, the system may evaluate purpose-action associations and warn an administrator when certain mappings are performed, for example. For instance, a system or administrator-defined setting can result in a warning if a certain number of purpose-action associations are configured for a purpose, e.g., as a general setting or a purpose-specific setting. In some cases, a first administrator may define a setting (e.g., a constraint) that sets a cap on how many actions can be associated with a specific purpose. The system may prevent (or may warn, and allow an override) if an administrator (e.g., the same or a different administrator) attempts to associate more processing actions with that purpose than are allowed by the cap. A cap may be set, for example, to prevent the system from being configured with a purpose that is too broad or general, such as a purpose that allows all processing actions in the system to occur, for instance. In some implementations, the system may download purpose action associations from another system. The system may check received constraints against certain pre-defined rules, such as to prevent automatically applying a configuration with too broad of purposes, as described above.

The assignment of processing actions to purposes might be done by the administrator in different ways. For example, a central service, such as a business context manager service or a data privacy integration service, might contain a list of all processing actions in the whole landscape and a list of all possible purposes in the whole landscape. The central service can provide both lists to the administrator and the administrator can select from both lists to create processing action/purpose mappings. In some cases, data about available processing actions that may be used for purpose/processing action mapping may be periodically fetched from the applications in the landscape. For example, each application might implement a callback API, which the central service calls on a periodic basis, or the central service might provide an API which every application calls, or the system may include a messaging service that supports the delivery of directed messages in an asynchronous manner or an event bus that supports messages based on a publish-subscribe pattern. For example, in a landscape with a first and a second application, both applications may inform the central service about their respective processing actions using one of the above-described methods.

Another possibility for assigning processing actions to purposes is for one or more administrators to create such assignments in a decentralized manner in which mappings are done separately at each of multiple applications in the landscape. However, a centralized approach may be preferable to provide a single point of entry for creating purpose/processing action mappings and for reducing a risk of misconfigurations that may occur if creating mappings in multiple different systems.

In some cases, the system includes process management software that tracks execution of processes by tracking corresponding events that occur in the system, including processing of personal data. Information captured by the process management software can be presented to users during customer purpose definition. For example, the tracked processing steps can be presented as options for assigning processing actions to purposes. As another example, processing action to purpose assignments can be automatically identified based on information captured by the process management software and presented to an administrator as recommended purpose/processing action mappings.

The runtime processing 246 can include purpose configuration information distribution 280 and purpose-based processing 282 that is performed based on configurations made in the configuration phase 244. Purpose configuration information distribution 280 can include distribution of purpose configuration information (e.g., purpose/processing action mappings) to applications and systems in the landscape. For example, purpose configuration information that is defined centrally by an administrator can be distributed to landscape applications. As another example, purpose configuration information that has been defined in a decentralized fashion in separate applications can be distributed to the other applications other than the application at which the purpose configuration information was created.

As an example, an administrator can initiate distribution of purpose configuration information by selecting an "activate" button in a user interface that triggers replication of the purpose configuration information. Purpose configuration information replication can be performed so that applications only receive purpose configuration information relevant to the respective application. For example, a first application can receive only purpose/processing action mapping information for processing actions actually performed in the first application and a second application can receive only purpose/processing action mapping information for processing actions actually performed in the second application (e.g., a processing action performed in the second application is associated with at least one processing unit from the second application).

In some cases, distribution of data is performed in a landscape based on configuration of data categories to purposes. For example, a self-learning system can observe which data attributes are necessary in a given system to fulfill a certain processing step. Learning results from the self-learning may be used to limit the transmission of data to a system to exactly what is needed in the system. For example, if a marketing system only needs an email address and a surname, the learning results learned by the self-learning system might influence data distribution so that only email and surname information is injected into the marketing system, and not other personal data An indication (or lack thereof) of data subject consent can also affect whether data is transferred to a system.

The purpose-based processing 282 during runtime processing can occur when data arrives at a processing unit. The processing unit can have a particular identifier, for example. The processing unit can be linked to a purpose, such as based on a processing action to which the processing unit belongs being mapped to a purpose. As an example, suppose a system has processing units PU1, PU2, PU3, and PU4, processing actions PA1 and PA2, and purposes P1, P2, and P3. Suppose also that processing units PU1, PU2, and PU3 are associated with the processing action PA1 and that processing units PU3 and PU4 are associated with the processing action PA2. The customer may associate the purposes P1 and P2 with the processing action PA1. Accordingly, all processing units that are associated with the processing action PA1 (e.g., the processing units PU1, PU2, and PU3) are inherently associated with the purpose P1 and the purpose P2. The customer may also associated the purposes P2 and P3 with the processing action PA2, which results in the processing units PU3 and PU4 inherently being associated with the purposes P2 and P3.

The processing unit, which has been mapped to a more abstract action, may be configured to obtain input data (e.g., as an actual parameter, from shared storage, from a global variable, or from an API or a return value of another processing unit). The data can be data from a field, a sub-object, or an object, for example. Before the processing unit obtains the input data (e.g., before the processing unit is invoked, before the processing unit accesses a shared storage area, global variable, or value from another API/function), a determination can be made as to whether the input data is of a certain data category that has been linked to a purpose. If the input data is of a certain data category that has been linked to a purpose, a determination can be made as to whether the purpose linked to the data category matches a purpose linked to the processing unit.

If the purpose linked to the data category matches a purpose linked to the processing unit, the processing unit can be obtain and process the input data. Other types of checks can be performed. For instance, in some cases, the data itself has been labeled with a purpose, and a check can be performed as to whether purpose of the data matches the purpose of the processing unit. Determining a purpose match between the data or data category of the input data to the purpose of the processing unit can implement purpose-based processing in the system so that processing of the data by the processing unit is performed for an allowed purpose. That is, the processing of the processing unit occurs only for a purpose for which the customer has defined.

If the processing unit which has been linked to a purpose receives input data which has not been labeled with a purpose (or which does not belong to a data category assigned to a purpose), the processing of the processing unit (e.g., the processing unit itself or specific processing of the input data) can be blocked or interrupted, and an error message can be presented to a user (as appropriate) and/or to an administrator. In some cases, such as in a test system, the processing unit execution can proceed but a warning message can be logged (and an administrator can be notified). The administrator (or an automated system) can review log data to analyze whether purpose information has been correctly configured in the system. In some cases, the system alerts the user that the input data does not have sufficient purpose information but allows an override option to request that execution of the processing unit proceeds. Processing unit executions that occur based on overrides can be logged and evaluated, as appropriate.

Runtime processing 246 can include evaluation of and handling of wildcards and other expressions that have been assigned to purposes during customer purpose definition 272. For example, an #unlabeled tag can be assigned to a purpose, which can indicate that any data not labeled with a data category can be processed for that purpose. During purpose-based processing 282 at runtime, if a processing unit that has been linked to the purpose tagged with #unlabeled is invoked with certain input data, the processing unit execution can proceed if the data is not associated with a purpose-related data category. Otherwise the execution can be blocked (or, as noted above, the execution can proceed but with error-logging and/or administrator notification).

As another example, compound expressions using logical operators can be assigned to a purpose during customer purpose definition 272. Logical operators can include operators that represent logical AND, OR, NOT, XOR operations, etc. (e.g., represented by operator symbols &&, ||, !, and xor, respectively). The logical operators can be applied to data category names and/or other compound expressions. For instance, a data category expression of "'private account" && ! "historic"" can be assigned to a purpose. For instance, the purpose may be "private reimbursement" for a WorkforcePerson object, and the data category expression can indicate that data for a private account for an employee can be used during the private reimbursement processing except reference account data that has been labeled with a data category of "historic".

During runtime processing, a "moneyTransfer" processing unit may be linked with the "private reimbursement" purpose (and possibly other purposes). When the money Transfer processing unit is to be invoked, a check can be performed to see if the data category expression matches the input data (e.g., returns true) when evaluated using the input data provided to the processing unit. If the data is of a private account data category and is not historic data, the moneyTransfer processing unit can be executed as part of carrying out the private reimbursement purpose for the employee.

In some situations, the system may receive a request to stop certain (or all) personal data processing for a data subject. For example, the data subject may send a request or the system may receive a request from an administrator such as if the administrator becomes aware that the data controller and the data subject are involved in a litigation or other dispute. Accordingly, processing actions that are purpose-based can also include a check to determine whether processing can be performed for a purpose for a certain data subject. As another example, a certain legal basis for the processing of personal data may no longer serve as a legal basis. For instance, a data subject may object to the processing or may withdraw a consent. In some cases, the system can use, for example, an internal or external consent system to check whether processing is allowed, before performing processing of personal data. As yet another example, in another type of scenario, data can still be processed, but the current state has to be conserved. For example, a court may order that a data controller is not allowed to modify or delete any data, because the data controller is involved in legal proceedings where the data is relevant. Then, the data controller can make a copy of the relevant data to conserve existing data and proceed as usual with future transactions. Other more general approaches can be used that include a rules engine that has defined prerequisites for executing each processing unit. If a prerequisite for an allowed run of a processing unit is not present, the processing unit execution can be prevented.

Runtime processing 246 of processing units that are not associated with a purpose can proceed without purpose-related checks. Processing units not associated with purposes can be allowed to process data of any data category (or data that is not labeled with a data category). Thus, the processing of data that is not associated with a purpose (such as data that is not considered personal data) by a processing unit is therefore not restricted by purpose-based checks. Furthermore, data not related to a data subject can be processed without purpose-based checks.

Figure 3:
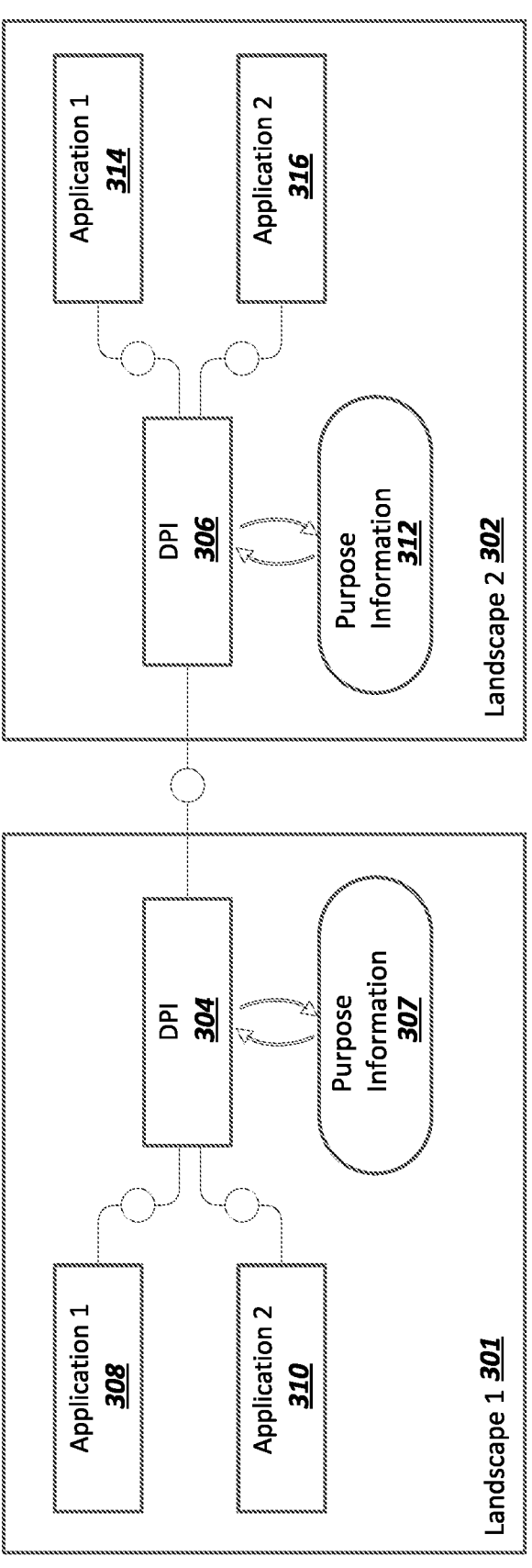
FIG. 3 is a block diagram of an example environment that includes multiple application landscapes.

FIG. 3 is a block diagram of an example environment 300 that includes multiple application landscapes. For example, the environment 300 includes a first landscape 301 and a second landscape 302. The first landscape 301 and the second landscape 302 may each be configured for separate entities (e.g., separate legal entities, such as for different corporate sub-entities, for different regions or countries, etc.). As another example, the different landscapes may be used for different purposes by an organization. For instance, the first landscape 301 may be a test landscape and the second landscape 302 may be a production landscape. As yet another example, in the public sector, a software provider may provide cloud software functionality to public entities but may need to provide data centers in certain different locations to meet government requirements of where data centers that process personal data may be located. In such an example, the first landscape 301 may implement a first data center at a first location for which processing a first set of personal data is allowed and the second landscape 302 may implement a second data center at a second location for which processing a second set of personal data is allowed. Although two landscape are shown, in other example, more than two landscapes may be used, for a given organization or by or for a software provider.

As shown in FIG. 3, the first landscape 301 and the second landscape 302 include a first DPI service 304 or a second DPI service 306, respectively. The first DPI service 304 and the second DPI service 306 can each operate independently of one another in a respective landscape. For example, the first DPI service 304 can be used for implementation of various DPI protocols and also for implementation of purpose-based processing based on purpose information 307 configured in or for the first landscape 301. For example, the purpose information 307 can include purpose definitions including associated data categories and also purpose/processing action mappings. The purpose information 307 can be used to implement purpose-based processing in a first application 308 and a second application 310 of the first landscape 301. Similarly, the second DPI service 306 can be used for implementation of purpose-based processing, based on purpose information 312, for processing in a first application 314 and a second application 316 of the second landscape 302.

In a multiple-landscape environment such as the environment 300, a data controller can specify a set of landscapes that share purpose information between landscapes. For example, the data controller can configure purpose information 307 in the first landscape 301 and transport at least a portion of the purpose information 307 to the second landscape 302, for storage in or as purpose information 312. For instance, in implementations where the first landscape 301 is a test landscape and the second landscape 302 is a production landscape, a customer can configure purpose-based processing in the first landscape 301, test the purpose-based processing in the first landscape 301, and in response to successful tests, transport at least a portion of the purpose information 307 to the second landscape 302, for storage in or as purpose information 312, for use in productive applications such as the first application 314 and the second application 316.

As another example, when the first landscape 301 and the second landscape 302 correspond to different data centers each offering cloud services (e.g., in a public sector setting), the data controller can share or transport the purpose configuration information from one cloud landscape (e.g., the first landscape 301) to another cloud landscape (e.g., the second landscape 302). As yet another example, transfer of purpose configuration information can be transferred between landscapes when a data controller customer has also two independent productive landscapes. For instance, the data controller may have one landscape (e.g., the first landscape 301) for Germany and another landscape (e.g., the second landscape 302) for France, where the two landscapes are not operationally integrated with each other but where the environment 300 includes a mechanism (e.g., in the first DPI service 304 and/or the second DPI service 306) through which purpose configuration information from one landscape can also be applied to another landscape.

Purpose information can be transferred between separate landscapes using different approaches. For instance purpose information can be transferred through API calls, using middleware, or exporting to external storage and importing to another landscape from the external storage. The purpose information, for example, can be exported from a source landscape in encrypted files and decrypted and applied at a target landscape. In some cases, a receiving landscape may evaluate received purpose information based on rules defined in the receiving landscape, and reject application of the purpose information in the receiving landscape if the received purpose information violates any defined rules. For example, similar to rules described above, if received purpose information corresponds to a mapping of a purpose to more than a threshold number of processing actions, the receiving system can decline to apply the received purpose information (and send an appropriate message to the sending system).

Although, as mentioned, each of the first DPI service 304 and the second DPI service 306 can be configured to run independently in respective landscapes, in some cases, a need may arise to integrate different DPI instances in different landscapes. For example, the second DPI service 306 can act as a dependent DPI service to the first DPI service 304, with regards to at least some purpose-based processing. For instance, processing unit(s) (or actions) originating from the second landscape 302 can be assigned to purposes originating from the first landscape 301.

As another example, a processing action defined in either or both of the first landscape 301 or the second landscape 302 may be associated with processing units from both landscapes. For example, for a given processing action, processing may start in the first landscape 301 (e.g., using at least a first processing unit in the first landscape 301) and may finish in the second landscape 302 (e.g., using at least a second processing unit in the second landscape 302). As another example, a processing action may start in the first landscape 301, continue in the second landscape 302, and finish in the first landscape 301. Other combinations of different-landscape processing are possible. The first DPI service 304, therefore, may query the second DPI service 306 about purpose information 312 (e.g., including processing action, processing unit, and purpose information), and enable a user defining purpose information 307 in the first landscape 301 to refer to at least some of the purpose information received from the second landscape 302. Information for purpose definition performed in the first landscape 301 can be forwarded to the second landscape 302. Accordingly, purpose configuration can be cross-landscape, resulting in reduced configuration time and potentially less errors as compared to separate landscape configuration, since common parts of the purpose configuration for both landscapes can be made together at once, by a same administrator, for example. This type of approach can be used, for example, in cases of joint data controllers (e.g., data controllers who jointly decide about the purposes and means of personal data processing).

Figure 4:
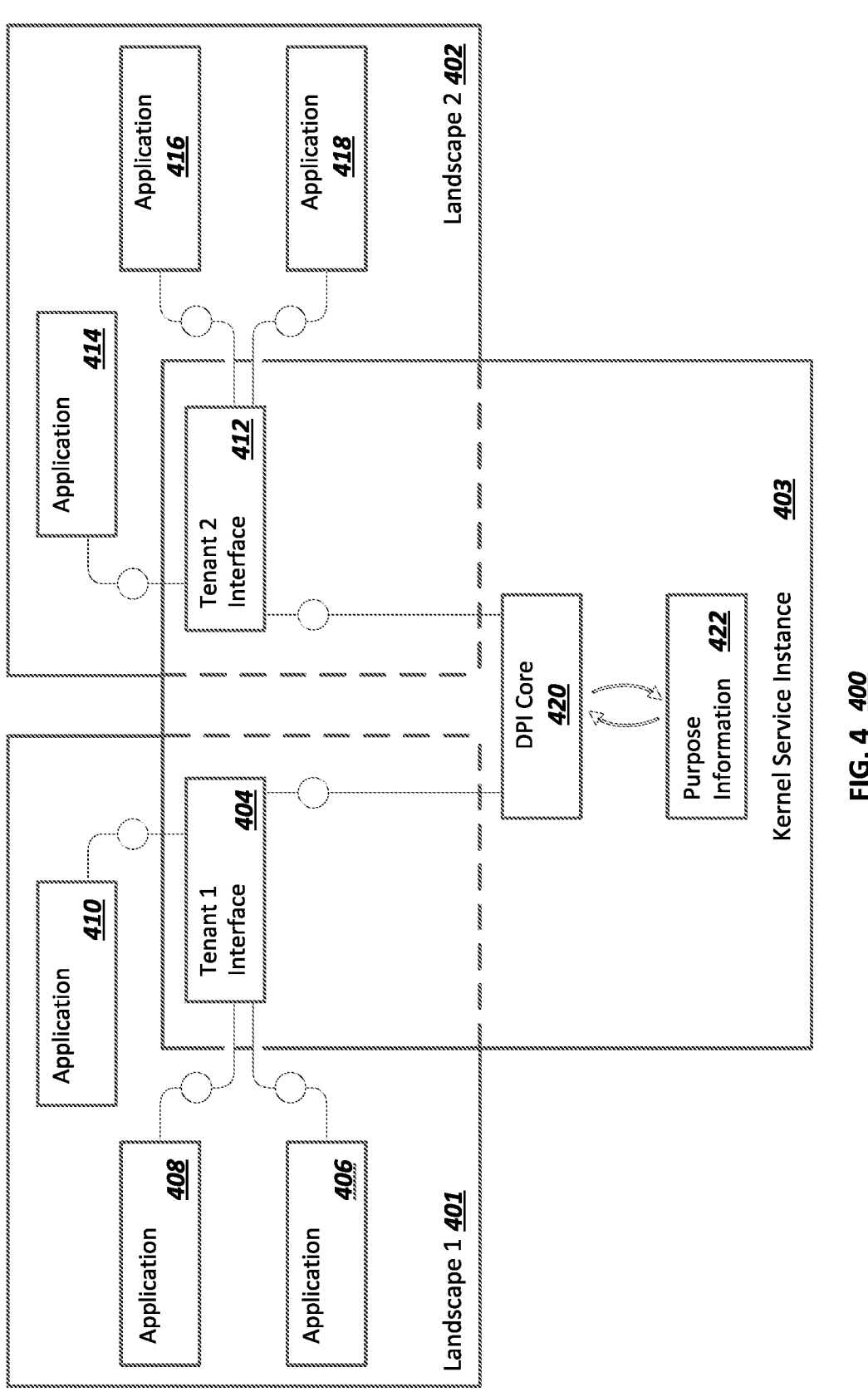
FIG. 4 is a block diagram of an example system for cross-tenant kernel services for data privacy integration protocols.

FIG. 4 is a block diagram of an example system 400 for cross-tenant kernel services for data privacy integration protocols. Similar to FIG. 3 described above, the system 400 includes a first landscape 401 and a second landscape 402. In this example, both the first landscape 401 and the second landscape 402 are serviced by a same data center. A kernel service instance 403 has a first DPI tenant 404 as a first DPI service managing DPI protocols for applications 406, 408, and 410 in the first landscape 401. The kernel service instance 403 also has a second DPI tenant 412 as a second DPI service managing DPI protocols for applications 414, 416, and 418 in the second landscape 402.

A DPI core component 420 and purpose information 422 can be used to take advantage of both landscapes being serviced by a same data center. The purpose information 422 can include at least some purpose information that is shared among different tenants. Common purpose information can be used by each of the first DPI tenant 404 and the second DPI tenant 412 without the common purpose information having to be transferred over a network, thereby decreasing resource usage and reducing a security risk that might arise due to network transfer. Although the purpose information 422 can include common purpose information, the purpose information 422 can also include tenant-specific purpose information specific to and accessible only by a given tenant.

Figure 5:
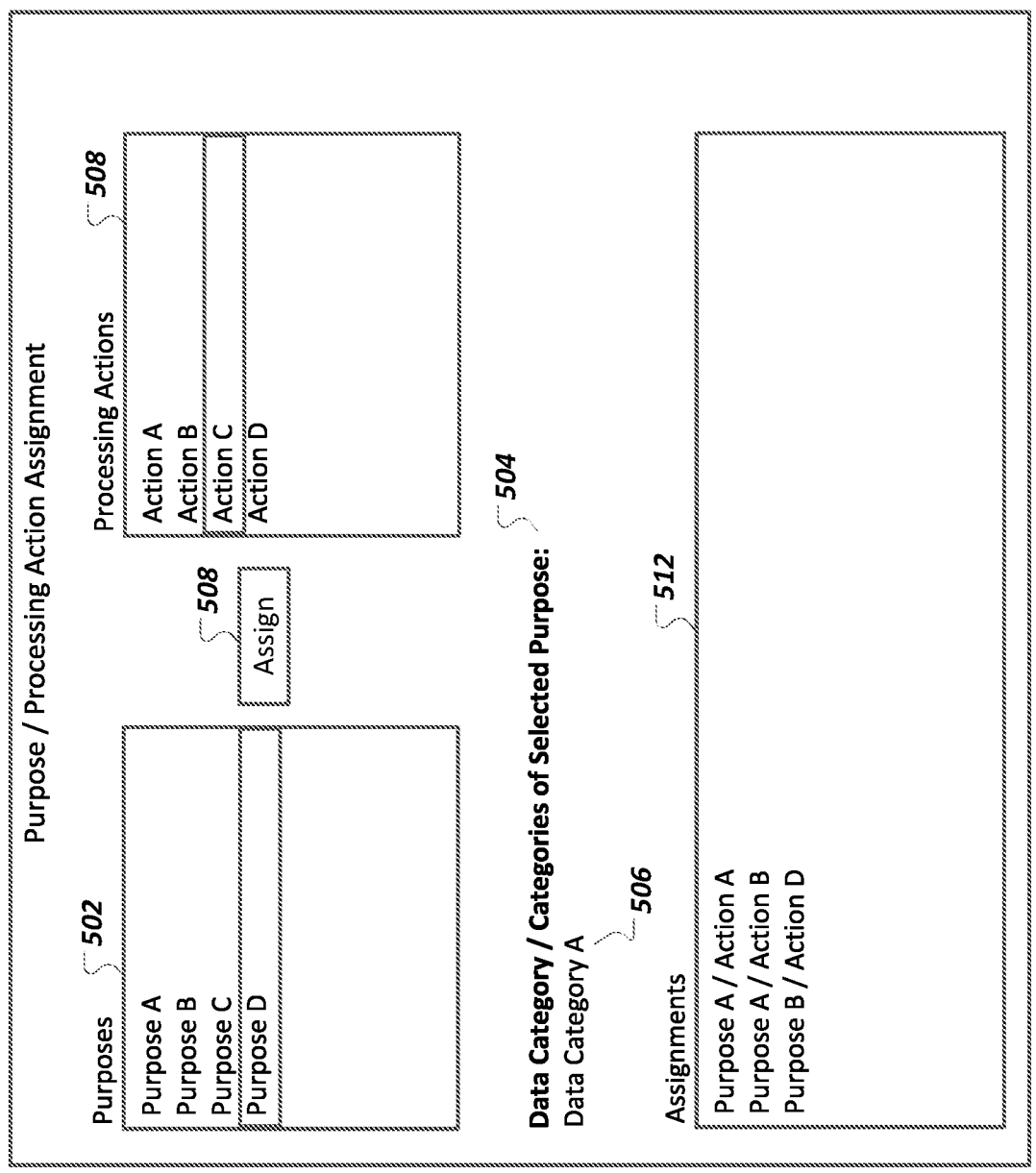
FIG. 5 illustrates an example user interface for assigning a purpose to a processing action.

FIG. 5 illustrates an example user interface 500 for assigning a purpose to a processing action. A purposes list 502 can display a list of known purposes that have been defined for a given system. For instance, the purpose list 502 includes Purpose A. Purpose B, Purpose C, and Purpose D. If the user selects a respective purpose, a data category area 504 can display one or more data categories that are linked to the selected purpose. For instance, the data category area 504 displays a Data Category A 506 that is linked to Purpose D that is selected in the purpose list 502. In some implementations, the user interface 500 only displays purposes in the purpose list 502 that have been assigned to a data category.

A processing actions list 508 can display a list of known processing actions for the system. For instance, the processing actions list 508 includes Action A, Action B, Action C, and Action D. The user can select a processing action in the processing action list 508. For instance, Action C has been selected. The user can select an assign button 510 to trigger linking of a processing action selected in the processing action list 508 with a purpose that is selected in the purpose list 502. For example, if the user selects the assign button, Purpose D can be linked to Action C.

An assignment area 512 displays current purpose/processing action assignments for the system. For example, the assignment area 512 includes Purpose A/Action A, Purpose A/Action B, and Purpose B/Action D assignments. As shown, a given purpose may be linked to one or more processing actions. Additionally, a given processing action may be linked to one or more purposes. Although the purpose list 502 and the processing action list 508 have been described with single-selection actions, in some implementations, the user interface 500 supports selection of multiple purposes and/or multiple processing actions, to link a purpose to multiple processing actions or to link a processing action to multiple purposes.

Figure 6:
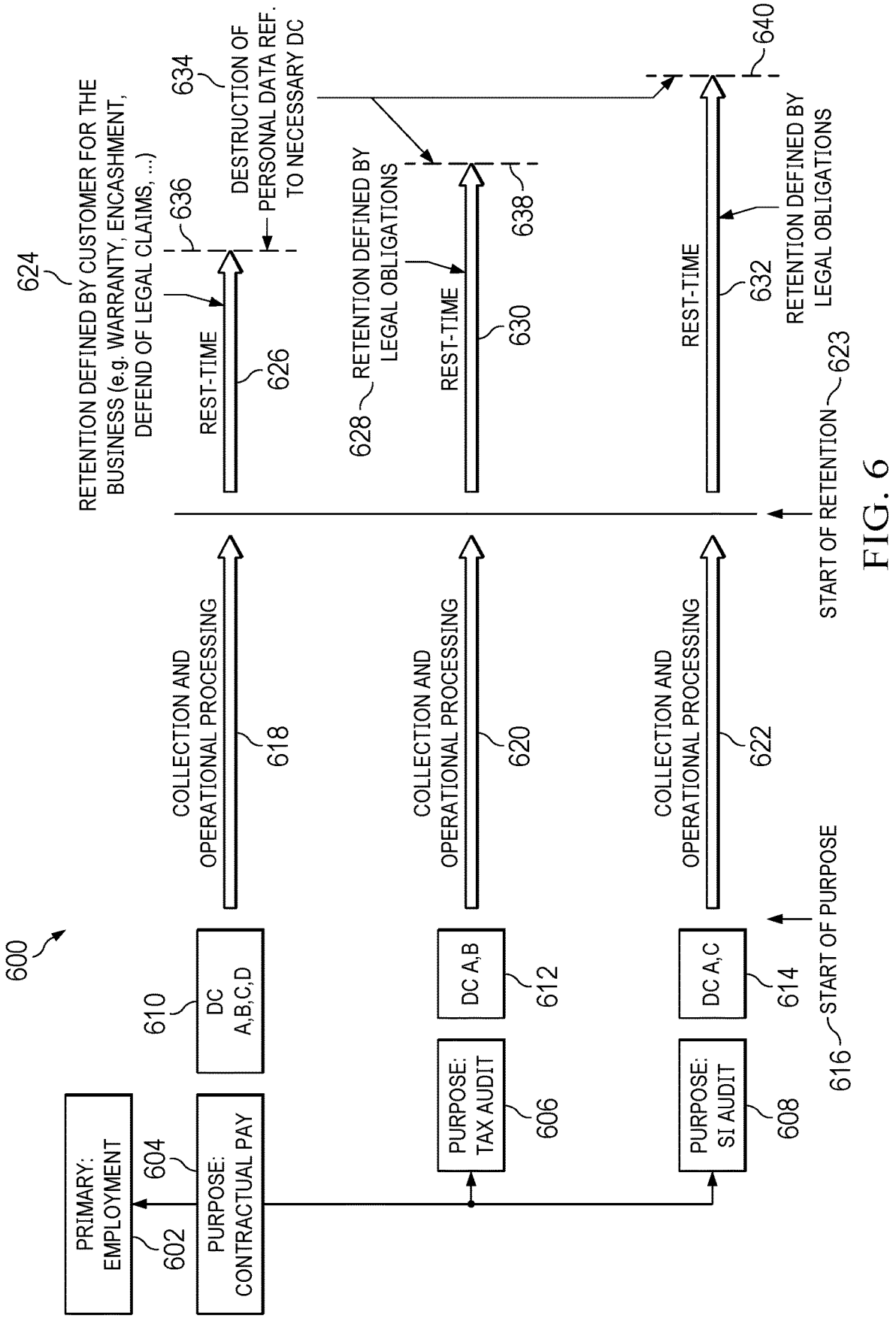
FIG. 6 illustrates an example purpose hierarchy.

FIG. 6 illustrates an example purpose hierarchy 600. As described above, the customer can define a purpose to represent a reason or a final goal for which a data controller processes personal data. However, in many cases, further detailed purposes may apply which serve the same final goal. The first purpose can be referred to as a primary purpose. The further purposes can be referred to as dependent purposes which are inextricably linked to the primary purpose. Accordingly, the setup of purposes can lead to establishment of a purpose hierarchy such as the purpose hierarchy 600.

Dependent purposes can allow for a more differentiated application and use of data protection measures, with regards to access rights and retention and deletion rules, for example. For instance, each of the purposes in the purpose hierarchy 600 may differ in different ways. For example, different purposes may have different data retention specifications due to requiring different data lifecycles. As another example, different purposes might include different sets of data categories. As configured, different purposes might be used define different regional scopes.

In some cases, dependent purposes may need to be configured due to external factors. For example, even if the data controller has defined different purposes according to data controller goals and use of a software system, purposes external to the data controller may also apply. Such external purposes may be needed due to national or regional legislation (e.g., social insurance, tax and trade laws, etc.) or jurisdiction (e.g., a federal labor court deciding that tracking working time of employees is mandatory by law). A data controller may thus be obliged to apply these external purposes as well as data controller defined purposes.

For example and as shown in the purpose hierarchy 600, a data controller has defined a primary purpose 602 of employment. The data controller has also defined, as a child of the primary purpose 602, a contractual pay purpose 604 for the processing of certain data (with data categories such as name, bank account, tax number, social insurance, etc.) to achieve the data controller goal or reason of paying salary to employees of the organization in response to their employment. The data controller can define retention times to keep the data used for contractual pay for a certain period after the payments have ended.

When the contractual pay purpose 604 is applied, however, other dependent purposes may also need to be executed. For example, a tax audit purpose 606 and a social insurance audit purpose 608, which are each child purposes of the contractual pay purpose 604, are purposes that in this example are mandated by local regulation in the country where the payroll processing initiated. Based on the configuration of the purpose hierarchy, when a contractual pay purpose 604 is applied to a data object, the tax audit purpose 606 and the social insurance audit purpose 608 can also automatically be applied to the data object (e.g., based on respective configured dependencies).

Additionally, even if the tax audit purpose 606 and the social insurance audit purpose 608 do not require any further collection and processing of personal data, either or both child purposes may require different retention periods and a different subset of the data categories defined for the contractual pay purpose 604. As illustrated, for example, the contractual pay purpose 604 is associated with data categories (DC) 610 of A, B, C, and D, while the tax audit purpose 606 is associated with just data categories A and B 612 and the social insurance audit purpose 608 is associated with just data categories A and C 614.

A start of purpose 616 can occur (e.g., the start of payroll processing) for a given employee. Respective data collection and/or operational processing activities 618, 620, and 622 can occur relevant to the contractual pay purpose 604, the tax audit purpose 606, and the social insurance audit purpose 608, respectively. The end of the respective data collection and/or operational processing activities 618, 620, and 622 can result in respective end of purpose being reached for those purposes, which can correspond to a start-of-retention period 623 for data used for those purposes, according to different retention policies for each of the purposes. For example and as described by a note 624, a retention period 626 for data of the data categories 610 for the contractual pay purpose 604 may be defined by the customer, such as based on warranty or encashment considerations and/or a need to defend against legal claims. As another example and as described by a note 628, retention periods 630 and 632 for the tax audit purpose 606 and the social insurance audit purpose 608, respectively, may be defined based on legal (e.g., legislated) obligations. The retention periods 630 and 632 apply to the data categories 612 or 614, respectively. In general, the data controller is obliged to retain data categories for a certain period based on information defined for the sub-tree of the purpose hierarchy 600 starting at the contractual pay purpose 604. That is, as described in a note 634, destruction of personal data can occur relative to retention periods of data categories in the purpose hierarchy 600.

For example, at a first end of retention time point 636 representing the end of the retention period 626 for the contractual pay purpose 604, the data controller can only destroy personal data of the data category D, because either or both of the tax audit purpose 606 or the social insurance audit purpose 608 have longer retention periods for data of data categories A, B, and C. At a second end of retention time point 638 representing the end of the retention period 630 for the tax audit purpose 606, the data controller can destroy personal data of the data category B, but not data of the data categories A or C, because the social insurance audit purpose 608 has a longer retention period for data of data categories A and C. At a third end of retention time point 640 representing the end of the retention period 632, the data controller can destroy data of the data categories A and C.

In some implementations, a dynamic determination may be performed to determine whether a dependent purpose applies at a certain point in time. For instance, suppose a certain country or other jurisdiction, for anti-discrimination purposes, passes new legislation that requires that employers collect gender identification information for new hires after the legislation goes into an effect on a certain date. The legislation may also require that employers periodically report proportions of gender identities at the employer, for example. Accordingly, an organization using software that manages employees may associate a "gender-reporting" dependent purpose with an "employment" purpose where the gender-reporting dependent purpose only instantiates as a dependent purpose to the employment purpose if the current date is after the date the legislation goes into effect.

FIG. 7A illustrates an example system 700 for design time configuration of primary and dependent purposes. A customer administrator, for example, can define a primary purpose 702 for a robotics machinery contract. The customer administrator can provide a name and description for the primary purpose 702. The customer administrator (or another user) can configure a purpose 704 as a child purpose of the primary purpose 702. The purpose 704 is for order payment. The customer administrator can assign data categories 706 to the purpose 704. The data categories 706 include payment date, delivery date, amount, tax identifier, and delivery address. The customer administrator can define a retention period 708 for the purpose 704 of one year. The customer administrator (or another user) can define a purpose 710 as a child purpose of the purpose 704. The purpose 704 is for tax auditing. The customer administrator can select a subset of the data categories 706 as data categories 712 for the purpose 710. The data categories 712 include data categories relevant for tax auditing, such as payment date, tax identifier, and amount. The customer administrator can also define a retention period 714 of seven years for the purpose 710 (e.g., where the retention period 714 is longer than the retention period 708).

FIG. 7B illustrates an example process 750 for runtime processing of data according to dependent purposes. The process 750 represents runtime processing based on design time information shown in FIG. 7A. At 752, an order payment purpose (e.g., corresponding to the purpose 704) is instantiated (e.g., selected) for a data subject. For example, an order payment process may be initiated for a supplier.

At 754, personal data for the supplier (e.g., as specified by the data categories 706) is collected under the purpose of order payment, during order payment processing.

At 756, a tax audit dependent purpose (e.g., corresponding to the purpose 710) is automatically instantiated, based on design time configuration information (e.g., as shown in FIG. 7A).

At 758, the order payment processing completes for the supplier (e.g., an end of purpose is reached for the order payment purpose).

At 760, in response to end of purpose being reached for the data collected for the supplier, the collected data is blocked. The blocking of the collected data can correspond to a start of retention periods for collected data. Since the purpose 704 and the purpose 710 have different retention periods 708 or 714, respectively, different portions of the data collected for the supplier can be retained for different periods of time. The data of the data categories 712 can be retained based on the retention period 714. The data of the data categories 706 that are not included in the data categories 712 can be retained based on the retention period 708.

At 762, data of the data categories 706 that are not included in the data categories 712 (e.g., data specific to the purpose 704 and not relevant to the purpose 710) is destroyed based on an end of the retention period 708 being reached, as illustrated by a first data destruction time point 763.

At 764, data of the data categories 712 (e.g., data relevant to the purpose 710) is destroyed based on an end of the retention period 714 being reached, as illustrated by a second data destruction time point 765.

Figure 8:
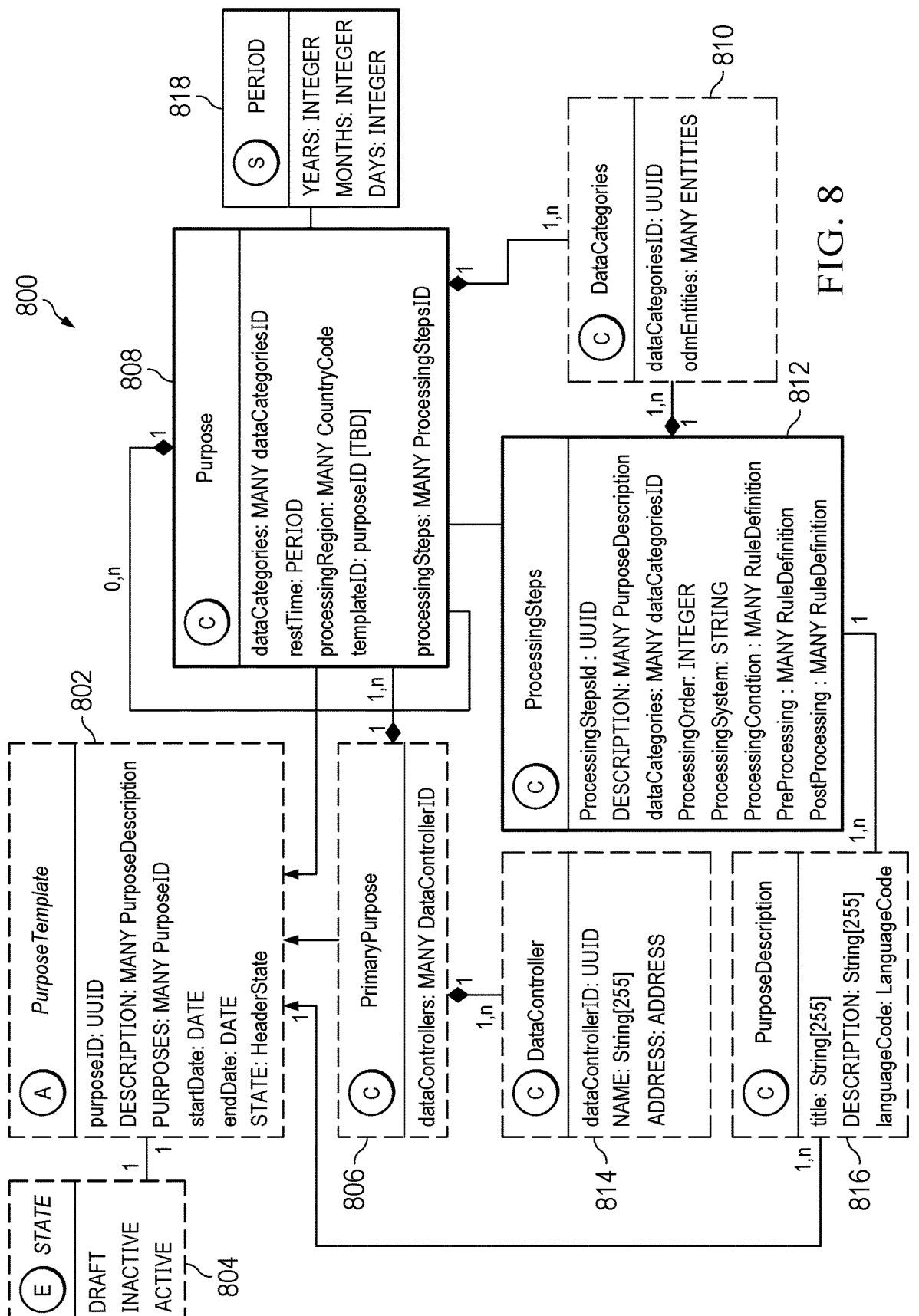
FIG. 8 illustrates an example data model for purpose-based processing

FIG. 8 illustrates an example data model 800 for purpose-based processing. The data model 800 includes Purpose-Template 802, State 804, PrimaryPurpose 806, Purpose 808, DataCategories 810, ProcessingSteps 812, DataController 814, PurposeDescription 816, Period 818, and Processing-Steps 820 entities.

The PurposeTemplate entity 802, which is linked to the Purpose Description entity 816 and the State entity 804, is an abstraction that can represent data common to the PrimaryPurpose entity 806 and the Purpose entity 808. Instances of the PurposeDescription entity 816 represent a purpose description in a particular language. The State entity 804 can be used to represent a state (e.g., draft, inactive, active) of a purpose.

The PrimaryPurpose entity represent a primary purpose defined by a data controller (e.g., an instance of the PrimaryPurpose entity 806 is linked to an instance of the data controller entity 814). An instance of the PrimaryPurpose entity may be, for example, the primary purpose 602 described above with respect to FIG. 6 or the primary purpose 702 described above with respect to FIG. 7. Instances of the PrimaryPurpose entity 806 represent a primary purpose that is a reason of personal data processing of data by a data controller (e.g., the primary purpose can answer a question of "why is personal data processed by the data controller"). The primary purpose can relate to a fulfillment of an agreement (e.g., contract, consent, or other agreed processing activities on the personal data) between a data subject and the data controller.

The primary purpose may be an abstract purpose that is associated with one or more concrete purpose instances of the Purpose entity 808. The Purpose entity instances can represent specific supporting activities for fulfilling the agreement of the primary purpose together with additional obligations and tasks for the primary purpose. As described above with respect to FIGS. 1-5, purpose-based processing can be purpose-based by assigning data categories to purposes and personal data and then matching a purpose of data to purposes that have been mapped to processing actions in the system. The ProcessingSteps entity 820 represents processing actions in the system. The Period entity 818 can represent a retention period for a purpose.

Figure 9:
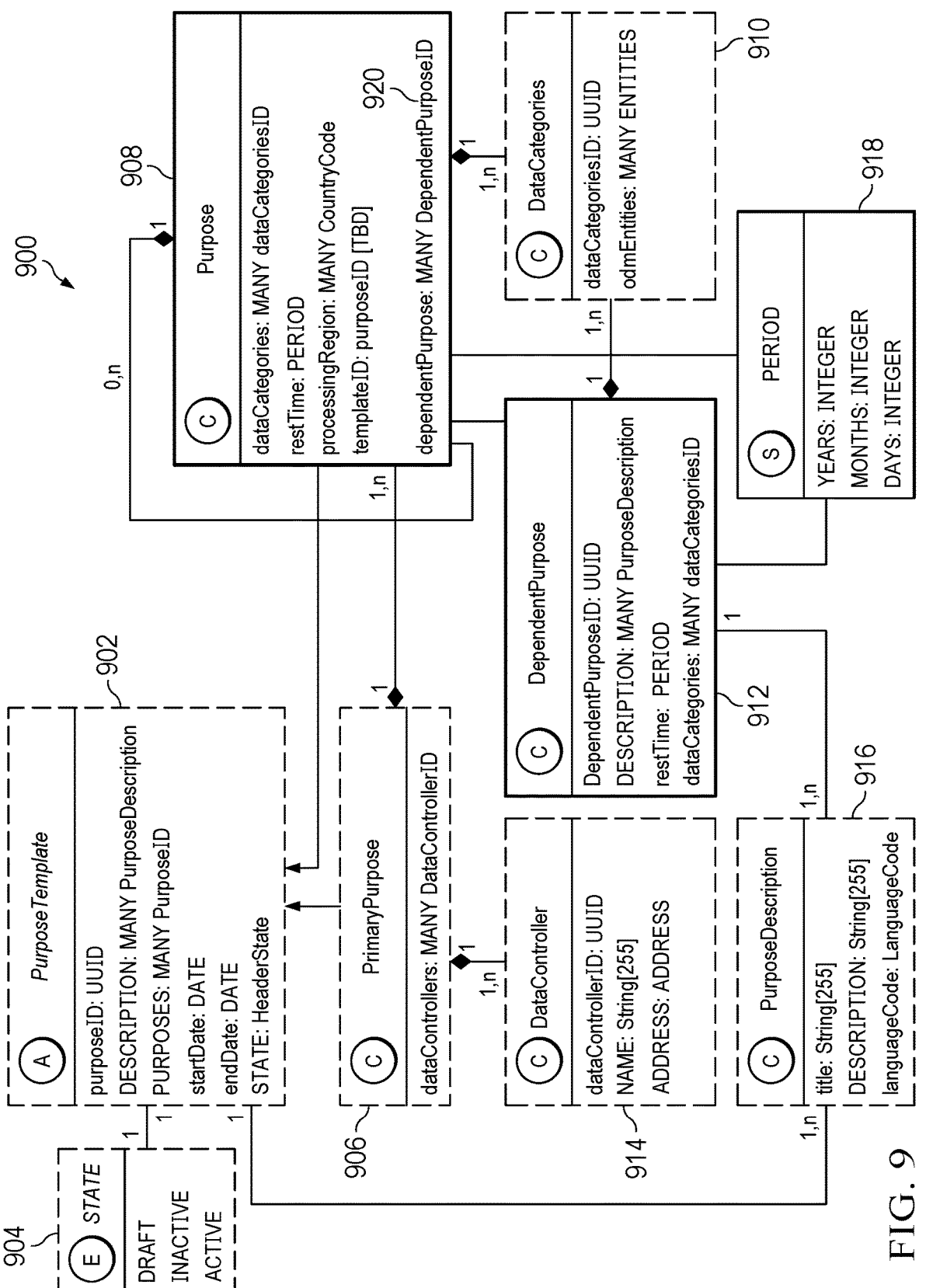
FIG. 9 illustrates an example data model for purpose-based processing.

FIG. 9 illustrates an example data model 900 for purpose-based processing. The data model 900 includes Purpose-Template 902, State 904, PrimaryPurpose 906, Purpose 908, DataCategories 910, DataController 914, PurposeDescription 916, and Period 918 entities that correspond to the PurposeTemplate 802, State 804, PrimaryPurpose 806, Purpose 808, DataCategories 810, DataController 814, PurposeDescription 816, and Period 818 entities described above with respect to FIG. 8. As described above with respect to FIGS. 6 and 7, a given purpose may have one or more associated dependent purposes, which are represented by the DependentPurpose entity 912. For example, an instance of the Purpose entity 908 can have a collection 920 of references to related DependentPurpose entities 912. An instance of the DependentPurpose entity 912 can have its own retention period configuration (e.g., the instance can be linked to an instance of the Period entity 918 that is a different Period entity 918 instance than one linked to a parent Purpose entity 908 instance). Although the data model 900 shows the Purpose entity 908 and the DependentPurpose entity 912 as separate types of entities, in some implementations, dependent purposes are also represented as Purpose entity 908 instances, and fields or relations of the Purpose entity can be used to model the dependencies between purpose instances.

FIG. 10 is a flowchart of an example method 1000 for purpose-based processing. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the server 102 of FIG. 1.

At 1002, information defining a first purpose for processing, in a software system, personal data of a first data category stored in a first object is received from a first customer of the software system.

At 1004, the information defining the first purpose is stored in a data store, in association with the first customer. The information defining the first purpose maps the first purpose to the first data category.

At 1006, data describing processing actions performed in the software system is provided to the first customer. The data describing processing actions performed in the software system can be or include data obtained from a process modeling system.

At 1008, a first mapping of a first processing action of the processing actions to the first purpose is received from the first customer. The first mapping indicates that data of the first data category of the first object can be processed by the first processing action for the first purpose. The first processing action can correspond to an abstract action that is associated with one or more executable processing units that include at least a first processing unit. The first processing unit can be a function, a method, a report, or some other type of executable processing unit.

At 1010, information for the first mapping is stored in the data store.

At 1012, input data to be obtained for the first processing action is identified.

At 1014, a determination is made as to whether the input data is of the first data category that has been mapped to the first purpose. Identifying input data to be obtained for the first processing action can include identifying an actual parameter value provided by a calling processing unit that invokes the first processing unit. As another example, identifying input data to be obtained for the first processing action can include identifying data the first processing unit has requested from shared storage or a global variable. As yet another example, identifying input data to be obtained for the first processing action comprises identifying data that an interface or function invoked by the first processing unit intends to provide to the first processing unit.

At 1016, a determination is made as to whether the input data can be used during execution of the first processing action for the first purpose based on determining whether the input data is of the first data category that has been mapped to the first purpose and that the first processing action has been mapped to the first purpose. If the input data is of the first data category that has been mapped to the first purpose and the first processing action has been mapped to the first purpose, a determination can be made that the input data can be used during execution of the first processing action for the first purpose, otherwise a determination can be made that the input data cannot be used during execution of the first processing action for the first purpose.

At 1018, the first processing action is executed using the input data as purpose-based processing of the input data, in response to determining that the input data can be used during execution of the first processing action for the first purpose.

At 1020, processing of the input data by the first processing action is prevented, in response to determining that the input data cannot be used during execution of the first processing action for the first purpose. Preventing processing of the input data by the first processing action can include, for example, preventing, by the calling processing unit, the invocation of the first processing unit with the actual parameter value. As another example, preventing can include preventing the first processing unit from obtaining the data the first processing unit has requested from the shared storage or the global variable. As yet another example, preventing can include preventing the first processing unit from obtaining the data that the interface or the function invoked by the first processing unit intends to provide to the first processing unit.

FIG. 11 is a flowchart of an example method 1100 for handling of dependent purposes. It will be understood that method 1100 and related methods may be performed, for example, by any suitable system, environment, software, and hardware, or a combination of systems, environments, software, and hardware, as appropriate. For example, one or more of a client, a server, or other computing device can be used to execute method 1100 and related methods and obtain any data from the memory of a client, the server, or the other computing device. In some implementations, the method 1100 and related methods are executed by one or more components of the system 100 described above with respect
to FIG. 1. For example, the method 1100 and related
methods can be executed by the server 102 of FIG. 1.

At 1102, a request is received to perform a processing
action for a data subject for a first purpose. The first purpose
can be defined by a customer of a software system. The
customer may have associated the first purpose with the first
processing action to enable purpose-based processing.

At 1104, the processing action is performed for the data
subject for the first purpose using data of a first set of data
categories that are associated with the first purpose. The first
purpose has a first retention period that specifies that data of
the first set of data categories is to be retained in a blocked
state after the processing action for the first purpose has
completed.

At 1106, a determination is made that the first purpose is
a parent purpose in a purpose hierarchy and that at least one
dependent purpose is associated with the first purpose in the
purpose hierarchy as a child purpose of the first purpose.

At 1108, a respective subset of data categories of the first
set of data categories that are associated with the dependent
purpose is determined, as dependent purpose data categories
for the dependent purpose, for each dependent purpose of
the at least one dependent purpose.

At 1110, a respective dependent purpose retention period
for the subset of data categories of the dependent purpose is
determined, for each dependent purpose of the at least one
dependent purpose. At least one dependent purpose retention
period is longer than the first retention period.

At 1112, a determination is made that an end of purpose
has been reached for the first purpose.

At 1114, data of the first set of data categories is blocked
according to the first retention period in response to deter-
mining that the end of purpose has been reached for the first
purpose.

At 1116, data in the first set of data categories that are not
dependent purpose data categories is retained in a blocked
state according to the first retention period.

At 1118, data of each dependent purpose data category is
retained in the blocked state according to a corresponding
dependent purpose retention period. For example, suppose:
1) the first set of data categories includes first, second, third,
and fourth data categories; 2) a first subset of data categories
for a first dependent purpose includes the first data category
and the third data category; and 3) a retention period for the
first purpose is one year and a dependent purpose retention
period for the first dependent purpose is two years. Data can
then be retained as follows: 1) data of the second data
category and the fourth data category can be retained for one
year (e.g., according to the retention period for the first
purpose, since neither the second data category nor the
fourth data category apply to a dependent purpose); and 2)
data of the first data category and the third data category can
be retained for two years (e.g., according to the dependent
purpose retention period for the first dependent purpose).

The preceding figures and accompanying description
illustrate example processes and computer-implementable
techniques. But system 100 (or its software or other com-
ponents) contemplates using, implementing, or executing
any suitable technique for performing these and other tasks.
It will be understood that these processes are for illustration
purposes only and that the described or similar techniques
may be performed at any appropriate time, including con-
currently, individually, or in combination. In addition, many
of the operations in these processes may take place simul-
taneously, concurrently, and/or in different orders than as
shown. Moreover, system 100 may use processes with additional operations, fewer operations, and/or different
operations, so long as the methods remain appropriate.

In other words, although this disclosure has been
described in terms of certain embodiments and generally
associated methods, alterations and permutations of these
embodiments and methods will be apparent to those skilled
in the art. Accordingly, the above description of example
embodiments does not define or constrain this disclosure.
Other changes, substitutions, and alterations are also pos-
sible without departing from the spirit and scope of this
disclosure.

In view of the above described implementations of subject
matter this application discloses the following list of
examples, wherein one feature of an example in isolation or
more than one feature of said example taken in combination
and, optionally, in combination with one or more features of
one or more further examples are further examples also
falling within the disclosure of this application

EXAMPLES

Example 1. A computer-implemented method comprising:
receiving, from a first customer of a software system,
    information defining a first purpose for processing, in
    the software system, personal data of a first data
    category stored in a first object;
storing the information defining the first purpose in a data
    store, in association with the first customer, wherein the
    information defining the first purpose maps the first
    purpose to the first data category;
providing, to the first customer, data describing process-
    ing actions performed in the software system;
receiving, from the first customer, a first mapping of a first
    processing action of the processing actions to the first
    purpose, wherein the first mapping indicates that data
    of the first data category of the first object can be
    processed by the first processing action for the first
    purpose;
storing information for the first mapping in the data store;
identifying input data to be obtained for the first process-
    ing action;
determining whether the input data is of the first data
    category that has been mapped to the first purpose;
determining whether the input data can be used during
    execution of the first processing action for the first
    purpose based on determining whether the input data is
    of the first data category that has been mapped to the
    first purpose and that the first processing action has
    been mapped to the first purpose;
executing the first processing action using the input data
    as purpose-based processing of the input data, in
    response to determining that the input data can be used
    during execution of the first processing action for the
    first purpose; and
preventing processing of the input data by the first pro-
    cessing action, in response to determining that the input
    data cannot be used during execution of the first
    processing action for the first purpose.

Example 2. The computer-implemented method of
Example 1, wherein the data store includes data for a second
customer of the software system, wherein the data for the
second customer includes information for a second purpose
for the second customer and a second mapping that maps the
second purpose to the first processing action, wherein the
second purpose is a different purpose than the first purpose.

Example 3. The computer-implemented method of any
one of the preceding examples, wherein the first processing action corresponds to an abstract action that is associated with one or more executable processing units that include at least a first processing unit.

Example 4. The computer-implemented method of any one of the preceding examples, wherein identifying input data to be obtained for the first processing action comprises identifying an actual parameter value provided by a calling processing unit that invokes the first processing unit.

Example 5. The computer-implemented method of any one of the preceding examples, wherein preventing processing of the input data by the first processing action comprises preventing, by the calling processing unit, an invocation of the first processing unit with the actual parameter value.

Example 6. The computer-implemented method of any one of the preceding examples, wherein identifying input data to be obtained for the first processing action comprises identifying data the first processing unit has requested from shared storage or a global variable.

Example 7. The computer-implemented method of any one of the preceding examples, wherein preventing processing of the input data by the first processing action comprises preventing the first processing unit from obtaining the data the first processing unit has requested from the shared storage or the global variable.

Example 8. The computer-implemented method of any one of the preceding examples, wherein identifying input data to be obtained for the first processing action comprises identifying data that an interface or function invoked by the first processing unit intends to provide to the first processing unit.

Example 9. The computer-implemented method of any one of the preceding examples, wherein preventing processing of the input data by the first processing action comprises preventing the first processing unit from obtaining the data that the interface or the function invoked by the first processing unit intends to provide to the first processing unit.

Example 10. The computer-implemented method of any one of the preceding examples, wherein the data describing processing actions performed in the software system includes data obtained from a process modeling system.

Example 11. A system comprising:
one or more computers; and
a computer-readable medium coupled to the one or more computers having instructions stored thereon which, when executed by the one or more computers, cause the one or more computers to perform operations comprising:
receiving, from a first customer of a software system, information defining a first purpose for processing, in the software system, personal data of a first data category stored in a first object;
storing the information defining the first purpose in a data store, in association with the first customer, wherein the information defining the first purpose maps the first purpose to the first data category;
providing, to the first customer, data describing processing actions performed in the software system;
receiving, from the first customer, a first mapping of a first processing action of the processing actions to the first purpose, wherein the first mapping indicates that data of the first data category of the first object can be processed by the first processing action for the first purpose;
storing information for the first mapping in the data store;
identifying input data to be obtained for the first processing action;

determining whether the input data is of the first data category that has been mapped to the first purpose;
determining whether the input data can be used during execution of the first processing action for the first purpose based on determining whether the input data is of the first data category that has been mapped to the first purpose and that the first processing action has been mapped to the first purpose;
executing the first processing action using the input data as purpose-based processing of the input data, in response to determining that the input data can be used during execution of the first processing action for the first purpose; and
preventing processing of the input data by the first processing action, in response to determining that the input data cannot be used during execution of the first processing action for the first purpose.

Example 12. The system of Example 11, wherein the data store includes data for a second customer of the software system, wherein the data for the second customer includes information for a second purpose for the second customer and a second mapping that maps the second purpose to the first processing action, wherein the second purpose is a different purpose than the first purpose.

Example 13. The system of any one of the preceding examples, wherein the first processing action corresponds to an abstract action that is associated with one or more executable processing units that include at least a first processing unit.

Example 14. The system of any one of the preceding examples, wherein identifying input data to be obtained for the first processing action comprises identifying an actual parameter value provided by a calling processing unit that invokes the first processing unit.

Example 15. The system of any one of the preceding examples, wherein preventing processing of the input data by the first processing action comprises preventing, by the calling processing unit, an invocation of the first processing unit with the actual parameter value.

Example 16. A computer program product encoded on a non-transitory storage medium, the product comprising non-transitory, computer readable instructions for causing one or more processors to perform operations comprising:
receiving, from a first customer of a software system, information defining a first purpose for processing, in the software system, personal data of a first data category stored in a first object;
storing the information defining the first purpose in a data store, in association with the first customer, wherein the information defining the first purpose maps the first purpose to the first data category;
providing, to the first customer, data describing processing actions performed in the software system;
receiving, from the first customer, a first mapping of a first processing action of the processing actions to the first purpose, wherein the first mapping indicates that data of the first data category of the first object can be processed by the first processing action for the first purpose;
storing information for the first mapping in the data store;
identifying input data to be obtained for the first processing action;
determining whether the input data is of the first data category that has been mapped to the first purpose;
determining whether the input data can be used during execution of the first processing action for the first purpose based on determining whether the input data is of the first data category that has been mapped to the first purpose and that the first processing action has been mapped to the first purpose;

executing the first processing action using the input data as purpose-based processing of the input data, in response to determining that the input data can be used during execution of the first processing action for the first purpose; and preventing processing of the input data by the first processing action, in response to determining that the input data cannot be used during execution of the first processing action for the first purpose.

Example 17. The computer program product of Example 16, wherein the data store includes data for a second customer of the software system, wherein the data for the second customer includes information for a second purpose for the second customer and a second mapping that maps the second purpose to the first processing action, wherein the second purpose is a different purpose than the first purpose.

Example 18. The computer program product of any one of the preceding examples, wherein the first processing action corresponds to an abstract action that is associated with one or more executable processing units that include at least a first processing unit.

Example 19. The computer program product of any one of the preceding examples, wherein identifying input data to be obtained for the first processing action comprises identifying an actual parameter value provided by a calling processing unit that invokes the first processing unit.

Example 20. The computer program product of any one of the preceding examples, wherein preventing processing of the input data by the first processing action comprises preventing, by the calling processing unit, an invocation of the first processing unit with the actual parameter value.

What is claimed is:

1. A computer-implemented method comprising:

receiving, from a first data controller that corresponds to a first tenant of a software system, information defining a first purpose for processing, for the first data controller, in the software system, personal data of a first data category stored in a first object;

storing the information defining the first purpose in a data store, in association with the first data controller, wherein the information defining the first purpose maps the first purpose to the first data category;

providing, to the first data controller, data describing processing actions performed in the software system;

receiving, from the first data controller, a first mapping of a first processing action to the first purpose, wherein the first mapping indicates that data of the first data category of the first object can be processed in the software system for the first data controller by the first processing action for the first purpose;

storing information for the first mapping in the data store in association with the first data controller, wherein the data store includes data for a second data controller that corresponds to a second tenant of the software system, wherein the data for the second data controller includes information for a second purpose for the second data controller and a second mapping that maps the second purpose to the first processing action and the first data category, wherein the second purpose is a different purpose than the first purpose;

receiving, at the software system and from a first user of the first data controller, first input data for the first processing action;

determining that the first input data can be used during execution in the software system of the first processing action for the first purpose for the first user of the first data controller based on determining that 1) the first input data is of the first data category that has been mapped to the first purpose for the first data controller and 2) the first processing action has been mapped to the first purpose for the first data controller;

executing the first processing action in the software system, using the first input data, as purpose-based processing of the first input data for the first user of the first data controller, in response to determining that the first input data can be used during execution in the software system of the first processing action for the first purpose for the first user of the first data controller;

receiving, at the software system and from a second user of the second data controller, second input data for the first processing action;

determining that the second input data cannot be used during execution in the software system of the first processing action for the second purpose for the second user of the second data controller based on determining that the second input data is of a second data category that is different from the first data category and which has not been mapped to the second purpose; and preventing processing of the second input data in the software system by the first processing action for the second user of the second data controller, in response to determining that the second input data cannot be used during execution of the first processing action for the second purpose for the second user of the second data controller.

2. The computer-implemented method of claim 1, wherein the first processing action corresponds to an abstract action that is associated with one or more executable processing units that include at least a first processing unit.

3. The computer-implemented method of claim 2, wherein receiving the second input data for the first processing action comprises identifying an actual parameter value provided by a calling processing unit that invokes the first processing unit.

4. The computer-implemented method of claim 3, wherein preventing processing of the second input data by the first processing action comprises preventing, by the calling processing unit, an invocation of the first processing unit with the actual parameter value.

5. The computer-implemented method of claim 2, wherein receiving the second input data to be obtained for the first processing action comprises identifying data the first processing unit has requested from shared storage or a global variable.

6. The computer-implemented method of claim 5, wherein preventing processing of the second input data by the first processing action comprises preventing the first processing unit from obtaining the data the first processing unit has requested from the shared storage or the global variable.

7. The computer-implemented method of claim 2, wherein receiving the second input data to be obtained for the first processing action comprises identifying data that an interface or function invoked by the first processing unit intends to provide to the first processing unit.

8. The computer-implemented method of claim 7, wherein preventing processing of the second input data by the first processing action comprises preventing the first processing unit from obtaining the data that the interface or the function invoked by the first processing unit intends to provide to the first processing unit.

9. The computer-implemented method of claim 1, wherein the data describing processing actions performed in the software system includes data obtained from a process modeling system.

10. A system comprising:

one or more computers; and a computer-readable medium coupled to the one or more computers having instructions stored thereon which, when executed by the one or more computers, cause the one or more computers to perform operations comprising:

receiving, from a first data controller that corresponds to a first tenant of a software system, information defining a first purpose for processing, for the first data controller, in the software system, personal data of a first data category stored in a first object;

storing the information defining the first purpose in a data store, in association with the first data controller, wherein the information defining the first purpose maps the first purpose to the first data category;

providing, to the first data controller, data describing processing actions performed in the software system;

receiving, from the first data controller, a first mapping of a first processing action to the first purpose, wherein the first mapping indicates that data of the first data category of the first object can be processed in the software system for the first data controller by the first processing action for the first purpose;

storing information for the first mapping in the data store in association with the first data controller, wherein the data store includes data for a second data controller that corresponds to a second tenant of the software system, wherein the data for the second data controller includes information for a second purpose for the second data controller and a second mapping that maps the second purpose to the first processing action and the first data category, wherein the second purpose is a different purpose than the first purpose;

receiving, at the software system and from a first user of the first data controller, first input data for the first processing action;

determining that the first input data can be used during execution in the software system of the first processing action for the first purpose for the first user of the first data controller based on determining that 1) the first input data is of the first data category that has been mapped to the first purpose for the first data controller and 2) the first processing action has been mapped to the first purpose for the first data controller;

executing the first processing action in the software system, using the first input data, as purpose-based processing of the first input data for the first user of the first data controller, in response to determining that the first input data can be used during execution in the software system of the first processing action for the first purpose for the first user of the first data controller;

receiving, at the software system and from a second user of the second data controller, second input data for the first processing action;

determining that the second input data cannot be used during execution in the software system of the first processing action for the second purpose for the second user of the second data controller based on determining that the second input data is of a second data category that is different from the first data category and which has not been mapped to the second purpose; and preventing processing of the second input data in the software system by the first processing action for the second user of the second data controller, in response to determining that the second input data cannot be used during execution of the first processing action for the second purpose for the second user of the second data controller.

11. The system of claim 10, wherein the first processing action corresponds to an abstract action that is associated with one or more executable processing units that include at least a first processing unit.

12. The system of claim 11, wherein receiving the second input data for the first processing action comprises identifying an actual parameter value provided by a calling processing unit that invokes the first processing unit.

13. The system of claim 12, wherein preventing processing of the second input data by the first processing action comprises preventing, by the calling processing unit, an invocation of the first processing unit with the actual parameter value.

14. A computer program product encoded on a non-transitory storage medium, the product comprising non-transitory, computer readable instructions for causing one or more processors to perform operations comprising:

receiving, from a first data controller that corresponds to a first tenant of a software system, information defining a first purpose for processing, for the first data controller, in the software system, personal data of a first data category stored in a first object;

storing the information defining the first purpose in a data store, in association with the first data controller, wherein the information defining the first purpose maps the first purpose to the first data category;

providing, to the first data controller, data describing processing actions performed in the software system;

receiving, from the first data controller, a first mapping of a first processing action to the first purpose, wherein the first mapping indicates that data of the first data category of the first object can be processed in the software system for the first data controller by the first processing action for the first purpose;

storing information for the first mapping in the data store in association with the first data controller, wherein the data store includes data for a second data controller that corresponds to a second tenant of the software system, wherein the data for the second data controller includes information for a second purpose for the second data controller and a second mapping that maps the second purpose to the first processing action and the first data category, wherein the second purpose is a different purpose than the first purpose;

receiving, at the software system and from a first user of the first data controller, first input data to be obtained for the first processing action;

determining that the first input data can be used during execution in the software system of the first processing action for the first purpose for the first user of the first data controller based on determining that 1) the first input data is of the first data category that has been mapped to the first purpose for the first data controller and 2) the first processing action has been mapped to the first purpose for the first data controller;

executing the first processing action in the software system, using the first input data, as purpose-based processing of the first input data for the first user of the first data controller, in response to determining that the first input data can be used during execution in the software system of the first processing action for the first purpose for the first user of the first data controller;

receiving, at the software system and from a second user of the second data controller, second input data for the first processing action;

determining that the second input data cannot be used during execution in the software system of the first processing action for the second purpose for the second user of the second data controller based on determining that the second input data is of a second data category that is different from the first data category and which has not been mapped to the second purpose; and preventing processing of the second input data in the software system by the first processing action for the second user of the second data controller, in response to determining that the second input data cannot be used during execution of the first processing action for the second purpose for the second user of the second data controller.

15. The computer program product of claim 14, wherein the first processing action corresponds to an abstract action that is associated with one or more executable processing units that include at least a first processing unit.

16. The computer program product of claim 15, wherein receiving the second input data for the first processing action comprises identifying an actual parameter value provided by a calling processing unit that invokes the first processing unit.

17. The computer program product of claim 16, wherein preventing processing of the second input data by the first processing action comprises preventing, by the calling processing unit, an invocation of the first processing unit with the actual parameter value.

\*　\*　\*　\*　\*